(12) United States Patent
Montague

(10) Patent No.: US 8,050,964 B2
(45) Date of Patent: Nov. 1, 2011

(54) COMPUTER-READABLE MEDIUM PRODUCT LABEL APPARATUS AND METHOD

(75) Inventor: David R. Montague, Mapleton, UT (US)

(73) Assignee: ETagz, Inc., Provo, UT (US)

( * ) Notice: Subject to any disclaimer, the term of this patent is extended or adjusted under 35 U.S.C. 154(b) by 1720 days.

(21) Appl. No.: 09/488,079

(22) Filed: Jan. 20, 2000

(65) Prior Publication Data

US 2001/0042009 A1  Nov. 15, 2001

Related U.S. Application Data

(63) Continuation-in-part of application No. 09/306,077, filed on May 6, 1999, now Pat. No. 6,298,332.

(51) Int. Cl.
*G07G 1/14* (2006.01)
(52) U.S. Cl. .......................................................... 705/14
(58) Field of Classification Search .................. 340/347; 235/462, 383; 705/1, 6, 26, 57, 14–23; 380/255, 380/258, 44, 266; 713/187, 190, 201; 345/168; 463/30; 707/505; 709/229, 225, 219; 395/210; 40/638, 312; 283/81; 206/216
See application file for complete search history.

(56) References Cited

U.S. PATENT DOCUMENTS

| | | | | |
|---|---|---|---|---|
| 2,020,381 A | * | 1/1933 | Labowitz et al. | 206/216 |
| 2,714,448 A | * | 3/1954 | Brown | 206/216 |
| 3,000,640 A | * | 10/1958 | Strauss | 369/273 |
| 2,973,410 A | * | 2/1961 | Hoshino et al. | 360/2 |
| 3,314,592 A | * | 4/1967 | Streich | 229/74 |
| 3,340,999 A | * | 9/1967 | Froehlig | 206/216 |
| 3,562,727 A | * | 2/1971 | Abbott et al. | 235/449 |
| 4,260,881 A | * | 4/1981 | Peterson | 235/493 |
| 4,511,033 A | * | 4/1985 | May | 206/216 |
| 4,812,633 A | * | 3/1989 | Vogelgesang et al. | 235/487 |
| 4,831,244 A | * | 5/1989 | Slafer et al. | 235/487 |

(Continued)

FOREIGN PATENT DOCUMENTS

CA  2176321  * 5/1996

(Continued)

OTHER PUBLICATIONS

"Chex Quest" Wikipedia on web found at http://en.wikipedia.org/wiki/Chex_Quest; printed on Nov. 26, 2009.

(Continued)

*Primary Examiner* — Arthur Duran
(74) *Attorney, Agent, or Firm* — Pate Baird, PLLC

(57) ABSTRACT

A user-computer-readable medium provides all or part of a product labeling system for engaging purchasers. Executables, data, or both are recorded in the medium embodied in a tag or other product labeling structure, in order to deliver to a consumer or purchaser engaging presentations of products, information, or registration templates. As a result, purchasers may receive launchers, browsers, viewers, e-mail systems, facsimile centers, players, or interface brokers for the foregoing, if organically installed already on a workstation of a purchaser. Software may provide catalog presentations, user registration templates, communications, linkers, or engines, and the like. Operation modules and profile builders may provide information over ready links implemented by software on the medium. In certain embodiments, entertainment, games, skill tests, and the like, recorded in the medium as a tag or label may execute to engage a purchaser and provide purchaser profiling information, product purchasing information, and the like to a vendor, while providing additional product information, warranty registrations, applications, entertainment, or the like, to a purchaser.

38 Claims, 20 Drawing Sheets

U.S. PATENT DOCUMENTS

| | | | | |
|---|---|---|---|---|
| 4,868,373 | A * | 9/1989 | Opheij et al. | 235/380 |
| 5,153,842 | A | 10/1992 | Dlugos, Sr. et al. | 364/478 |
| 5,284,689 | A * | 2/1994 | Laurash et al. | 428/41.6 |
| 5,309,355 | A | 5/1994 | Lockwood | 364/401 |
| 5,333,106 | A * | 7/1994 | Lanpher et al. | 600/538 |
| 5,375,240 | A * | 12/1994 | Grundy | 713/200 |
| 5,576,951 | A | 11/1996 | Lockwood | 395/227 |
| 5,611,051 | A * | 3/1997 | Pirelli | 395/210 |
| 5,710,886 | A | 1/1998 | Christensen et al. | 395/214 |
| 5,711,672 | A * | 1/1998 | Redford et al. | 434/307 R |
| 5,776,586 | A * | 7/1998 | Lipper | 428/195 |
| 5,794,213 | A * | 8/1998 | Markman | 705/23 |
| 5,805,164 | A * | 9/1998 | Blum et al. | 345/347 |
| 5,809,481 | A | 9/1998 | Baron et al. | 705/14 |
| 5,825,292 | A | 10/1998 | Tsai et al. | 340/572 |
| 5,881,538 | A * | 3/1999 | Blohm | 53/461 |
| 5,898,777 | A * | 4/1999 | Tycksen et al. | 705/53 |
| 5,907,617 | A * | 5/1999 | Ronning | 705/52 |
| 6,134,593 | A * | 10/2000 | Alexander et al. | 709/229 |
| 6,195,006 | B1 * | 2/2001 | Bowers et al. | 340/572.1 |
| 6,195,432 | B1 * | 2/2001 | Takahashi et al. | 380/277 |
| 6,216,112 | B1 * | 4/2001 | Fuller et al. | 705/14 |
| 6,405,203 | B1 * | 6/2002 | Collart | 707/10 |
| 6,463,467 | B1 * | 10/2002 | Mages et al. | 709/218 |
| 2001/0003041 | A1 * | 6/2001 | Redford et al. | 434/307 R |
| 2001/0034634 | A1 * | 10/2001 | Ueda | 705/10 |
| 2001/0054014 | A1 * | 12/2001 | Noda et al. | 705/26 |

FOREIGN PATENT DOCUMENTS

| | | | |
|---|---|---|---|
| WO | WO 01/11530 | * | 2/2001 |

OTHER PUBLICATIONS

"PC Gamer" Wikipedia on web found at http://en.wikipedia.org/wiki/PC_Gamer; printed on Nov. 26, 2009.

"Covermount" Wikipedia on web found at http://en.wikipedia.org/wiki/Covermount; printed on Nov. 26, 2009.

"Technology" Promo Magazine found on web at http://promomagazine.com/mag/marketing_technology_2/, Aug. 1, 1998, printed Dec. 14, 2009.

Vogons, "Old CD Magazines/Magazine CDs for download" found on web at http://vogons.zetafleet.com/viewtopic.php? p=168435; posted Aug. 24, 2009, printed Dec. 14, 2009.

"The YS Rock'n'Roll Years—Issue 22" found at http://www.ysrnry.co.uk/vs22.htm; printed on Dec. 23, 2010.

MOJO Magazine Collectors Edition, Aug. 1997, Issue 45.

* cited by examiner

COMPUTER-READABLE MEDIUM PRODUCT LABEL APPARATUS AND METHOD

RELATED INVENTIONS

This application is a Continuation-In-Part of patent application Ser. No. 09/306,077, filed on May 6, 1999, now U.S. Pat. No. 6,298,332, and entitled CD ROM PRODUCT LABEL APPARATUS AND METHOD.

BACKGROUND

1. The Field of the Invention

This invention relates to product labeling and, more particularly, to novel systems and methods for providing electronic feedback and user information by registration with vendors of products.

2. The Background Art

Product registration is always a concern of manufacturers and vendors of products. Information concerning user purchases, attitudes, circumstances, and the like are matters of great interest. However, user registration through warranty cards and the like meet with only limited success. Moreover, limited information is provided.

Likewise, brand loyalty is not necessarily detectible nor useful to such vendors and manufacturers. An ability to obtain user registration information for warranty and follow-up sales activity often lacks any great consumer or user motivation. Thus, not only information is lacking by motivation, and any continuing link with a consumer or user may be absent.

What is needed is a system and method for enabling a comparatively long term relationship to exist between a supplier, manufacturer, vendor of goods or services, and the consumer, purchaser, or user of same.

An advance in the art might provide additional services to a consumer or user as well. For example, personal information such as shoe sizes, clothing sizes, recreational goods, preferences in recreational or business activities, and the like might be extremely valuable information for a user to maintain and catalog for future use. Also, such personal purchasing information might be invaluable to suppliers of goods and services. Moreover, it would be an advancement in the art to provide a system and method for purchasers to maintain key information regarding their own preferences and purchases as well as providing to users historical information that they may reference in the future. To the extent that a consumer or purchaser desires to provide such information to a vendor during a search for new or replacement goods or services, having ready access to such information could be invaluable to both a purchaser and a vendor.

Thus, it would be an advance in the art to provide an easy interaction apparatus and method for identifying and recording product or purchasing information, personal preference information, and the like, for ready provision of same to a purchaser and to a vendor upon request and authorization.

BRIEF SUMMARY AND OBJECTS OF THE INVENTION

In view of the foregoing, it is a primary object of the present invention to provide a computer-readable medium product label providing a link back from a purchaser to a vendor. In certain embodiments, an apparatus and method in accordance with the invention may provide operational data, executables, linking information, suitable software, templates, and the like for facilitating an exchange of information between vendors and purchasers. For example, templates for collecting and delivering user information including warranty data, user preferences and motivations, and the like may be integrated with warranty reporting information, and other useful data in a delivery system built upon a computer-readable medium product label, such as a hang tag or any tag attached to a product. In certain embodiments, executables and operational data may be delivered to a user on a computer-readable medium that alone, or in combination with other packaging materials, presents a panoply of multimedia presentations, games, entertainment, and information-collection applications.

For example, a product may be labeled with a tag that includes a computer-readable medium of an ordinary or novel shape. The novel shape may also be labeled with various slogans, messages, trade-marks, images, logos, or the like, provided by the vendor. Meanwhile, the computer-readable medium product label may contain multimedia catalog presentations; products information regarding the exact product on which the tag was shipped from a manufacturer; a registration engine for registering user information and product information simultaneously, a profile builder for identifying additional user information that a purchaser is willing and interested in providing, such as preferences in entertainment, software, music, video, gaming, or the like; and other useful software.

Software available on a computer-readable medium product label may include a launcher, browser, viewer, e-mail, facsimile sender, player, or other executables as well as vendor data. Moreover, such software may be programmed to invite, entice, motivate, and facilitate providing information by a user to be reported back to a vendor. A concierge or valet provides ready access to important information required by a purchaser at the time or point of purchase. Software may also collect and provide to a user or a vendor, or both, upon request and authorization, any amount of vendor or purchaser information deemed useful.

The computer-readable medium product label, may be configured to be attached to a variety of products including clothing, toys, footgear, machinery, headgear, foodstuffs furniture, appliances, sporting goods, dry goods, tools, and plants. The label may be configured to be attached to the product or the product packaging. The label may be attached to the product in a manner to protect the label from damage during shipping. The product packaging may also serve to protect the label. The label may be shipped separately from the product with its own packing and padding.

Consistent with the foregoing objects, and in accordance with the invention as embodied and broadly described herein, a method and apparatus are disclosed in one embodiment of the present invention as including a computer-readable medium, apparatus, and a method for delivering vendor-supplied information to a purchaser, while providing reporting facilitation software and purchaser-provided data as well as internet linking from a purchaser back to a vendor an apparatus made in accordance with one embodiment of the invention may include a computer-readable medium, user interface data or a user interface executable, vendor catalog information, various input templates, multimedia presentations, applications such as tools, utilities, games, desk accessories, or the like.

Various data structures or databases for collecting or maintaining output data or input data serviced by input executables or output executables may stand alone or may integrate with browsers, launchers, viewers, or other applications.

Such applications may be provided as executables on a computer-readable medium product label, or may merely integrate or engage browsers, launchers, viewers, and applications "organic" to a user's computer. That is, executables may be provided on a computer-readable medium product label or may merely be accessed by data on a computer-readable medium product label.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 9, is not intended to limit the scope of the invention, as claimed, but is merely representative of the presently preferred embodiments of the invention.

The presently preferred embodiments of the invention will be best understood by reference to the drawings, wherein like parts are designated by like numerals throughout. FIGS. 1-20 illustrate schematic diagrams showing, in considerable detail, certain presently preferred embodiments of apparatus and methods in accordance with the invention. Those of ordinary skill in the art will, of course, appreciate that various modifications to the detailed schematic diagrams may easily be made without departing from the essential characteristics of the invention, as described. Thus, the following description of the Figures is intended only by way of example, and simply illustrates certain presently preferred embodiments of the invention as claimed herein.

Figure 1:
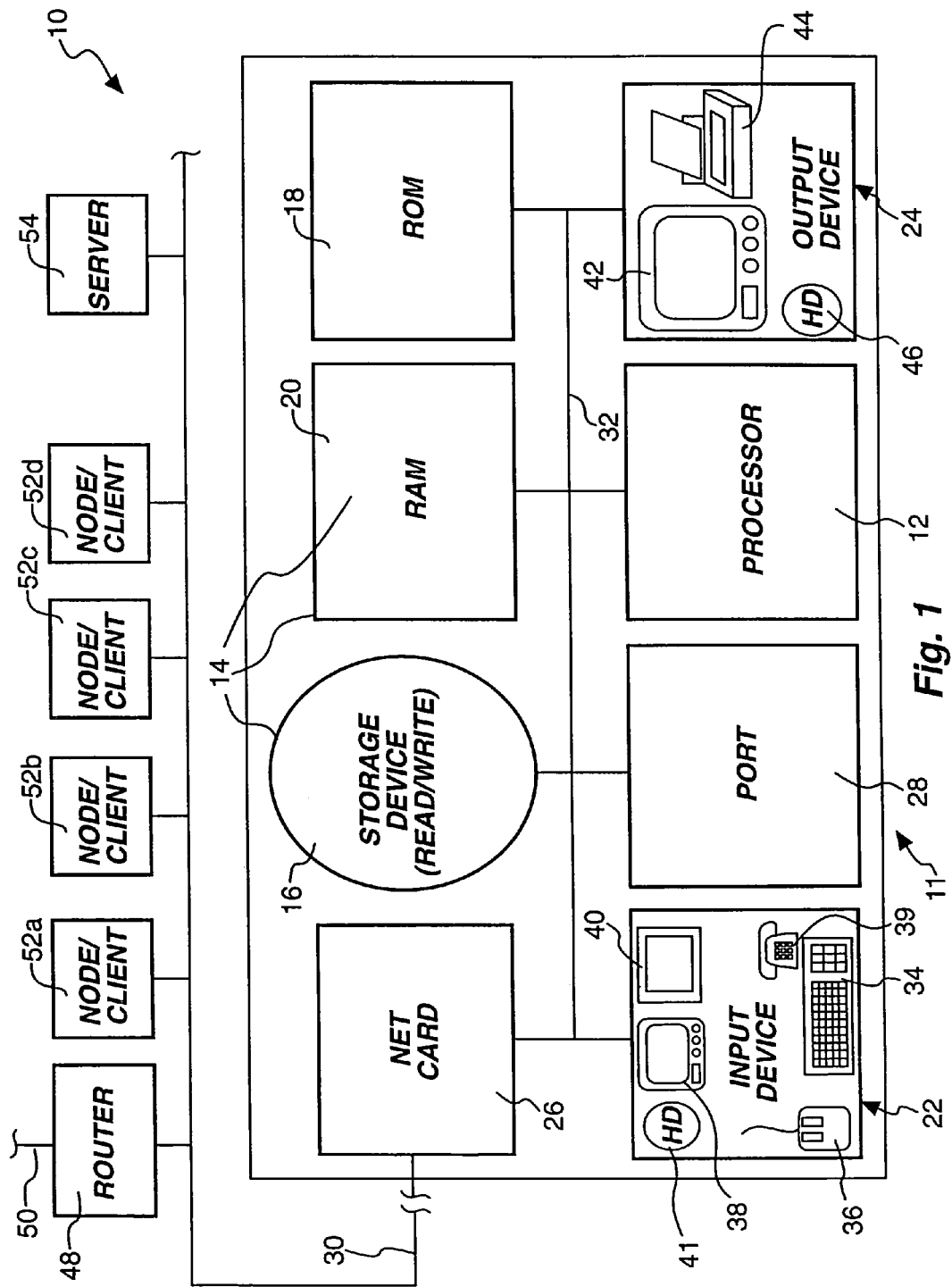
FIG. 1 is a schematic block diagram of computers in a network and internetwork that may implement the apparatus and method in accordance with the invention.

Referring now to FIG. 1, an apparatus 10 may implement the invention on one or more nodes 11, (client 11, computer 11) containing a processor 12 or CPU 12. All components may exist in a single node 11 or may exist in multiple nodes 11, 52 remote from one another. The CPU 12 may be operably connected to a memory device 14. A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like. Similarly, a scanner 40 may be used to receive graphical inputs which may or may not be translated to other character formats. The hard drive 41 or other memory device 41 may be used as an input device whether resident within the node 11 or some other node 52 (e.g., 52*a*, 52*b*, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 52, 54) may have various communication capabilities.

In certain embodiments, a minimum of logical capability may be available in any node 52. Note that any of the individual nodes 11, 52, 54 may be referred to, as may all together, as a node 11 or a node 52. Each may contain a processor 12 with more or less of the other components 14-44.

A network 30 may include one or more servers 54. Servers may be used to manage, store, communicate, transfer, access, update, and the like, any practical number of files, databases, or the like for other nodes 52 on a network 30. Typically, a server 54 may be accessed by all nodes 11, 52 on a network 30. Nevertheless, other special functions, including communications, applications, directory services, and the like, may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12-46 may need to communicate data with one another. A communication link may exist, in general, between any pair of devices.

Figure 2:
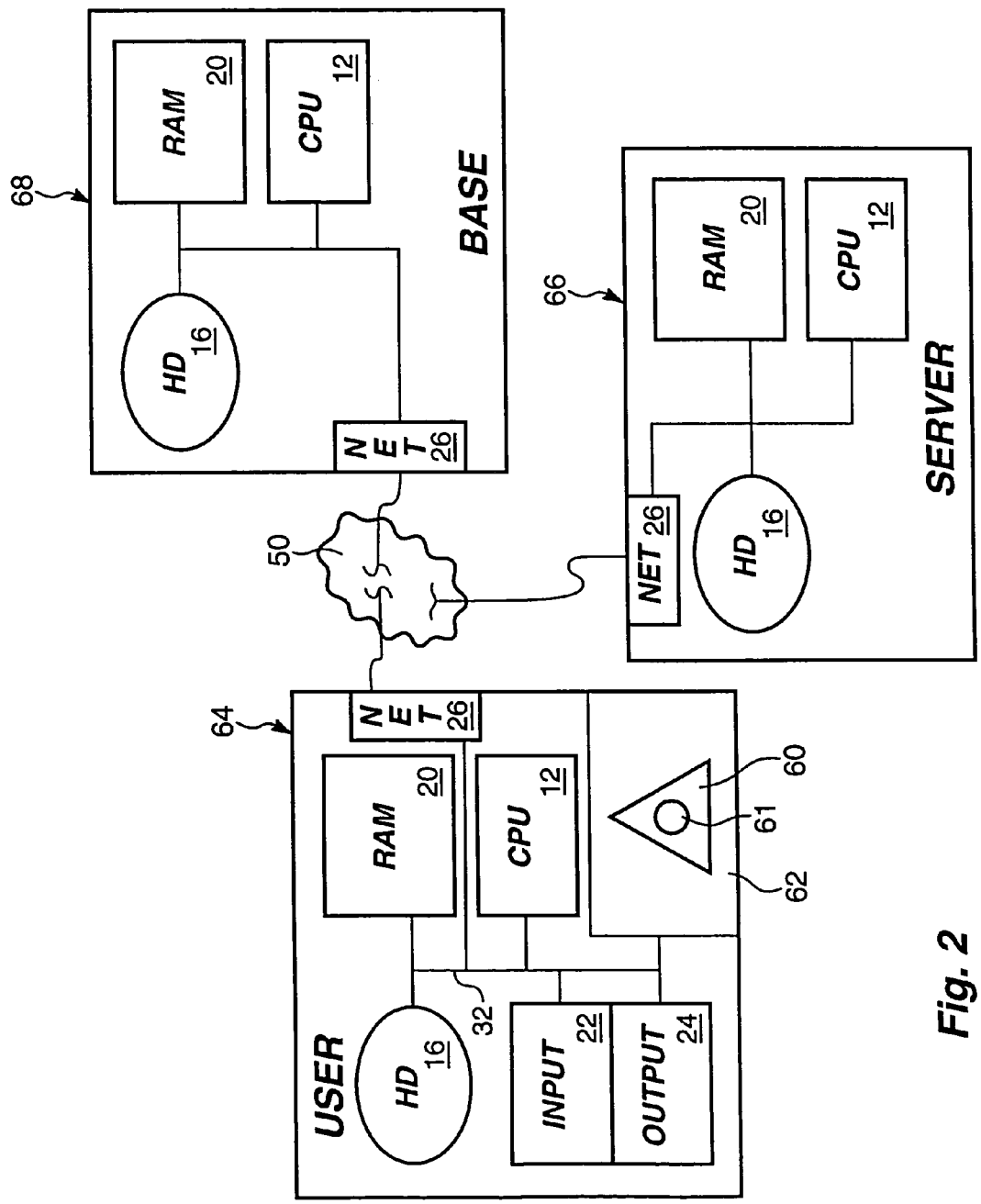
FIG. 2 is one embodiment of a user computer, a server, and a base computer, typically owned, controlled, or accessed by a vendor, for communicating information in response to user or vendor requests.

Referring now to FIG. 2, a CD-ROM tag 16 may include an aperture 61 for aligning or engaging with a drive 62 for playing the CD-ROM 60. A Drive 62 in a user workstation 64 may provide linking information or executables facilitating interaction between the user workstation 64 and a server 66, such as a third party or vendor server, typically maintained by a service provided. For example, the server 66 may be an e-mail server a data service server, a web site server, or other accessible servers.

Meanwhile, a base computer 68 or simply base 68 is typically maintained by a vendor and may be a server, a web site server, a communication server, or may simply be the computer system of a vendor interested in interacting with either a third party server 66 a user workstation 64, or both. In general, the workstation 64, the server 66, and the base 68 may be remote from one another geographically and connected over some type of network 50. Thus, the input devices 22 and output devices 24 provide interaction by a user at a workstation 64 in order to provide inputs and extract information in response to prompts from software hosted on the CD-ROM 60. Note that the CD-ROM 60 is not necessarily circular in shape. The CD-ROM 60 need only be properly balanced for spinning and having sufficient space circumscribed by a circle thereon to store the data tracks required for the amount of information provided on the CD-ROM 60.

Figure 3:
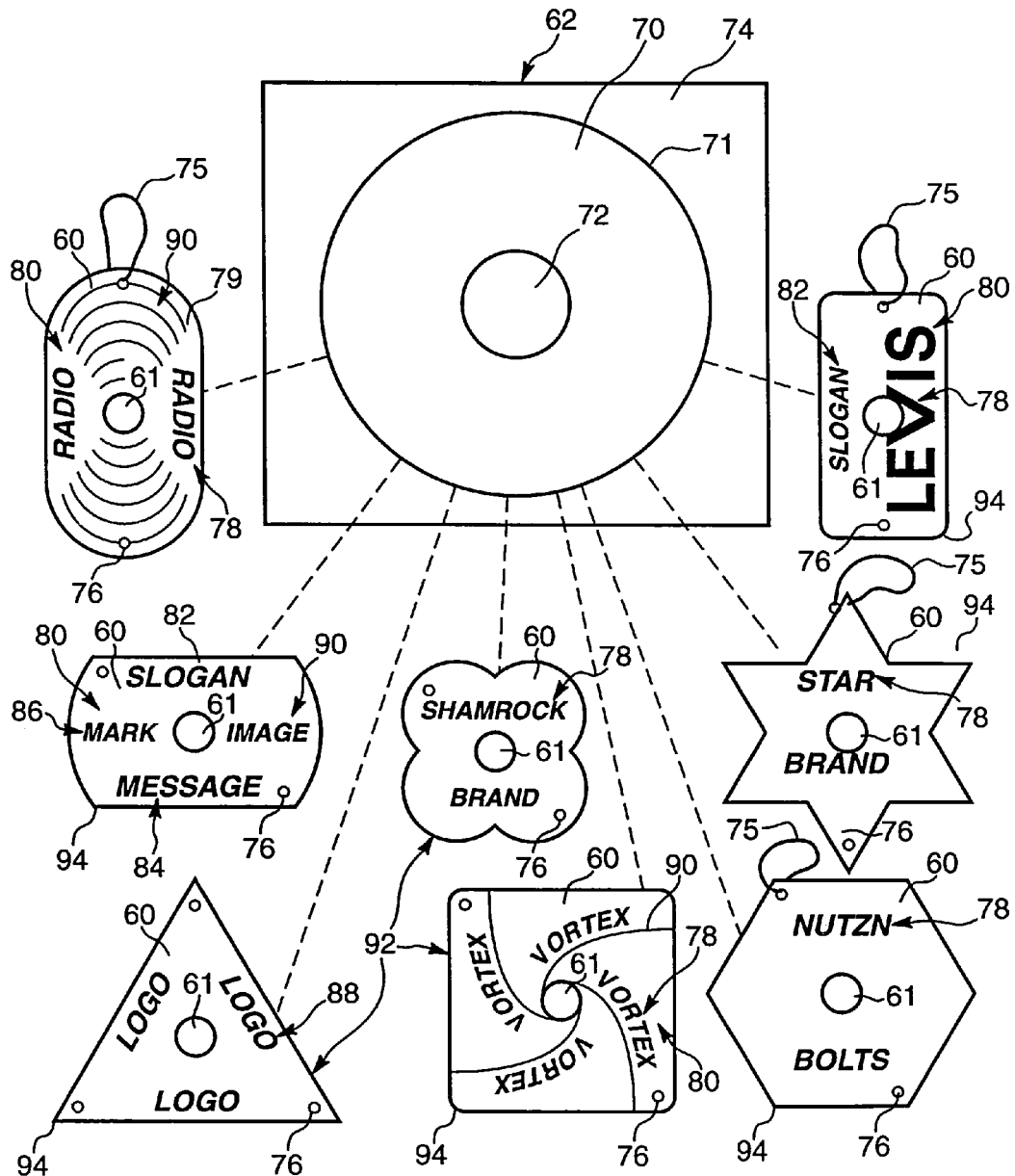
FIG. 3 is schematic diagram of various alternative configurations of CD-ROM hang-tags or product labels in accordance with the invention.
Figure 4:
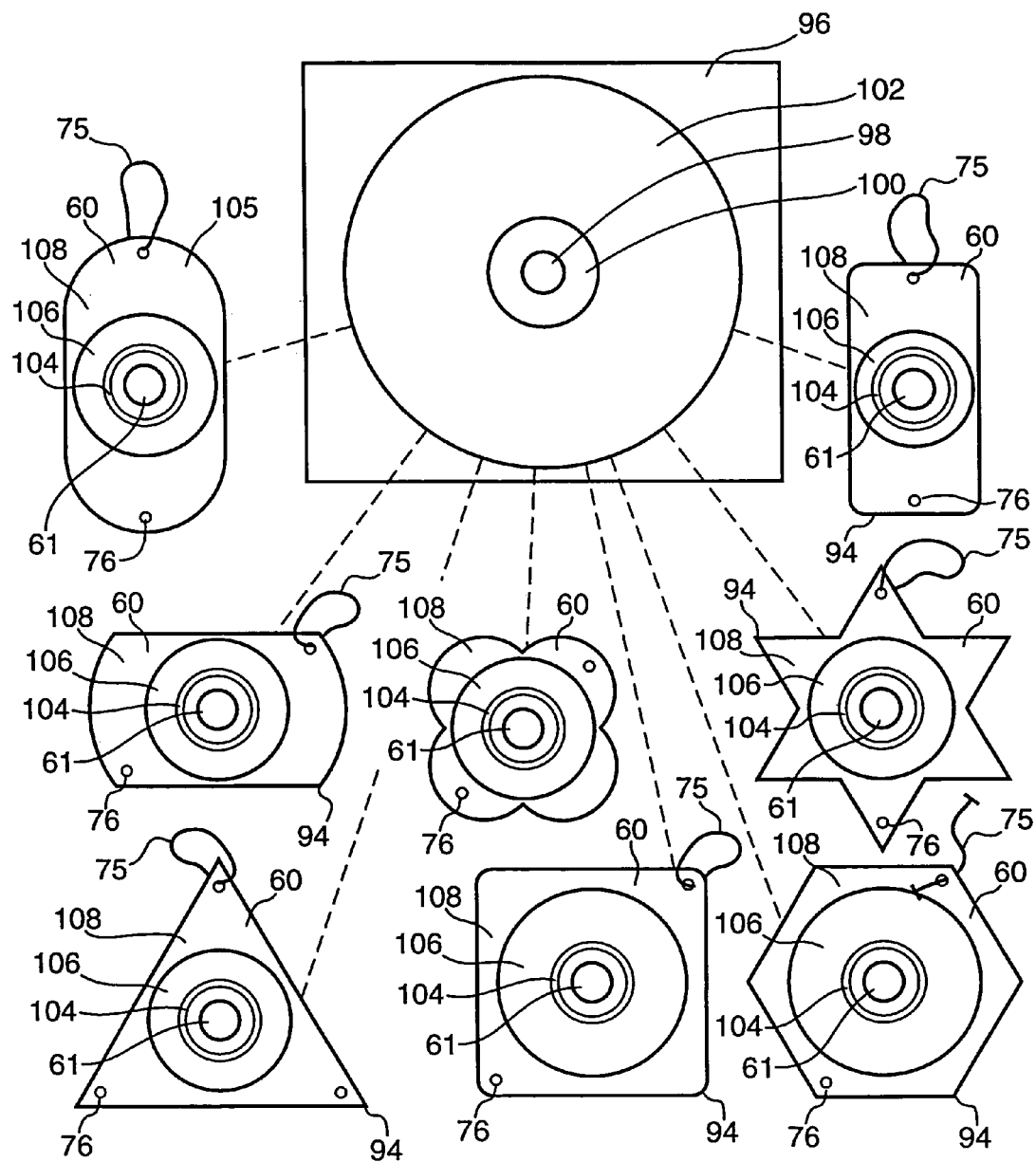
FIG. 4 is schematic diagram of the information sides of the CD-ROM hang-tags.
Figure 5:
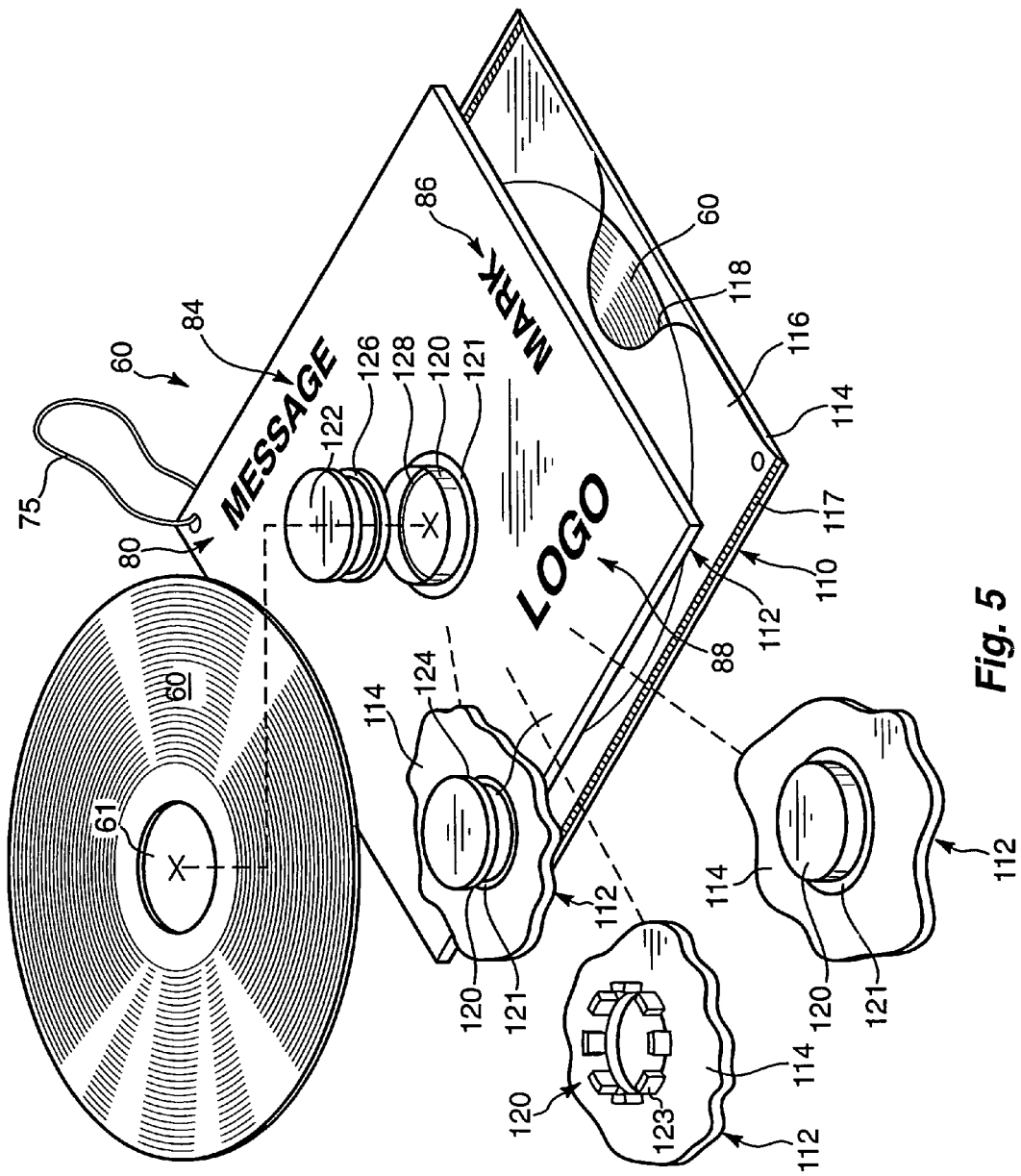
FIG. 5 is a schematic illustration of various embodiments of product labeling for presenting CD-ROMs of FIGS. 3-4 including sleeves, substrates, holders, keepers, labels, tethers, and the like, for delivery of CD-ROMs to purchasers as part of product labeling.

Referring now to FIGS. 3-5, a tray 70 may be provided as part of a drive 62 or CD-ROM drive 62. In general, the tray 70, as illustrated in FIG. 3 reflects an upper portion 70 of a drive 62. Thus, the tray 70 may have an alignment rim 71 for orienting the CD-ROM 60. An alignment of a CD-ROM 60 facilitates proper engagement of the CD-ROM 60. Accordingly clearance cavity 72 may be provided to receive a spin or head of a driver 62 for spinning the CD-ROM 60. Thus, the tray 70 may be regarded as part of a transport 74 or frame 74 for moving a CD-ROM 60 into and out of the drive 62.

In general, a CD-ROM 60 may be of any suitable arbitrary, but symmetrical shape. A tether 75 secured through a penetration 76 may secure the CD-ROM tag 60 to a product. As a practical matter, the penetration 76 may be distributed in a balanced fashion to prevent even small variation in the balance on a CD-ROM tag 60.

A vendor may choose to provide a product, brand, vendor, or other name 78 on a visible face 79 of a CD-ROM tag 60. In general, the name 78 and other information provided on the visible face 79 of the CD-ROM tag 60 represent vendor identification 80, in general. Other vendor identification 80 may include slogans 82, which may themselves be trademarked or registered as trademarks. Messages 84 and other marks 86 or trademarks 86 proprietary to a vendor for ready identification to users (purchasers, consumers) while providing additional impressions on behalf of a vendor.

Typically, logos 88 may be prominent on the visible face 79 of a CD-ROM tag 60. Likewise, various images 90 or symbols 90 related to either the content of the CD-ROM tag 60, the product on which the CD-ROM tag 60 is affixed, or related to other aspects of the vendor providing the CD-ROM tag 60 may be provided in any number of colors with suitable graphic appeal.

In general, a shape 92 or an edge 92 may also provide an overall impression of a CD-ROM tag 60. Any suitable shape that will still work with a drive 62 may be suitable. In certain embodiments, a CD-ROM tag 60 may have vertices 94 or corners 94. As a practical matter, a CD-ROM tag 60 may be strictly circular or formed in a variety of shapes as illustrated in FIGS. 3-4.

Referring to FIG. 4, a chassis 96 of the drive 62 may mount an arbor 98 adapted to fit the aperture 61 in a CD-ROM tag 60. A drive 100 may engage a CD-ROM tag 60 for rotation. A cavity 102 or clearance 102 in the chassis 96 provides suitable clearance for rotation of the CD-ROM tag 60 about the arbor 98 through the aperture 61. The CD-ROM 60 may include system tracks 104 containing information peculiar to the operation of the workstation 64 or the drive 62. However, the data face 105 may contain content tracks 106 in addition to the system tracks 104. The content tracks contain substantive data provided by a vendor and targeted to a user. The content tracks 106 need only fit within the particular shape 92 of a CD-ROM tag 60 and are thus typically placed well away from any corners 94 in favor of a continuous central portion of the CD-ROM 60.

As a practical matter, the penetrations 76 may be provided with tethers 75 for connecting a CD-ROM 60 to various products. For example, in the clothing industry, various types of tethering mechanisms have been developed to facilitate automatic insertion of securement mechanisms with minimum labor and minimum cost. Nevertheless, alternative embodiments may operate independent of the tethers 75.

Referring to FIG. 5, a sleeve 110 or substrate 112 may mount or otherwise secure a CD-ROM tag 60 to a product. The sleeve 110 or substrate 112 may be secured directly to a package, or tethered thereto by a tether 75 as illustrated in FIGS. 3-5. In one embodiment, a backing 114 may connect to a cover 116 having a seam 117 for securing or bonding 117 the cover 116 to the backing 114. Thus, a CD-ROM 60 may be inserted between the cover 116 and backing 114 forming a sleeve 110 or envelope 110. In other embodiments, a pedestal 120 or stub 120 may penetrate the aperture 61 to retain a CD-ROM tag. In certain embodiments, a foot 121 of a pedestal 120 may secure the pedestal 120 to a substrate 112 or backing 114. Similarly, some type of keeper 122 may serve to retain the CD-ROM tag 60 on the pedestal 120. In selected embodiments, fingers 123 may provide both the pedestal and retention function. In other embodiments, a detent 124 may provide securement or engagement of a CD-ROM tag 60 with a pedestal 120. Securing the CD-ROM 60 thereto.

In certain embodiments, a lock 126 may engage a catch 128 for securing a keeper 122 into or onto a pedestal 120. The orientation of the lock 126 and catch 128 as well as the peculiar mechanism for latching them together may be a matter of virtually infinite mechanical engagement techniques.

Figure 6:
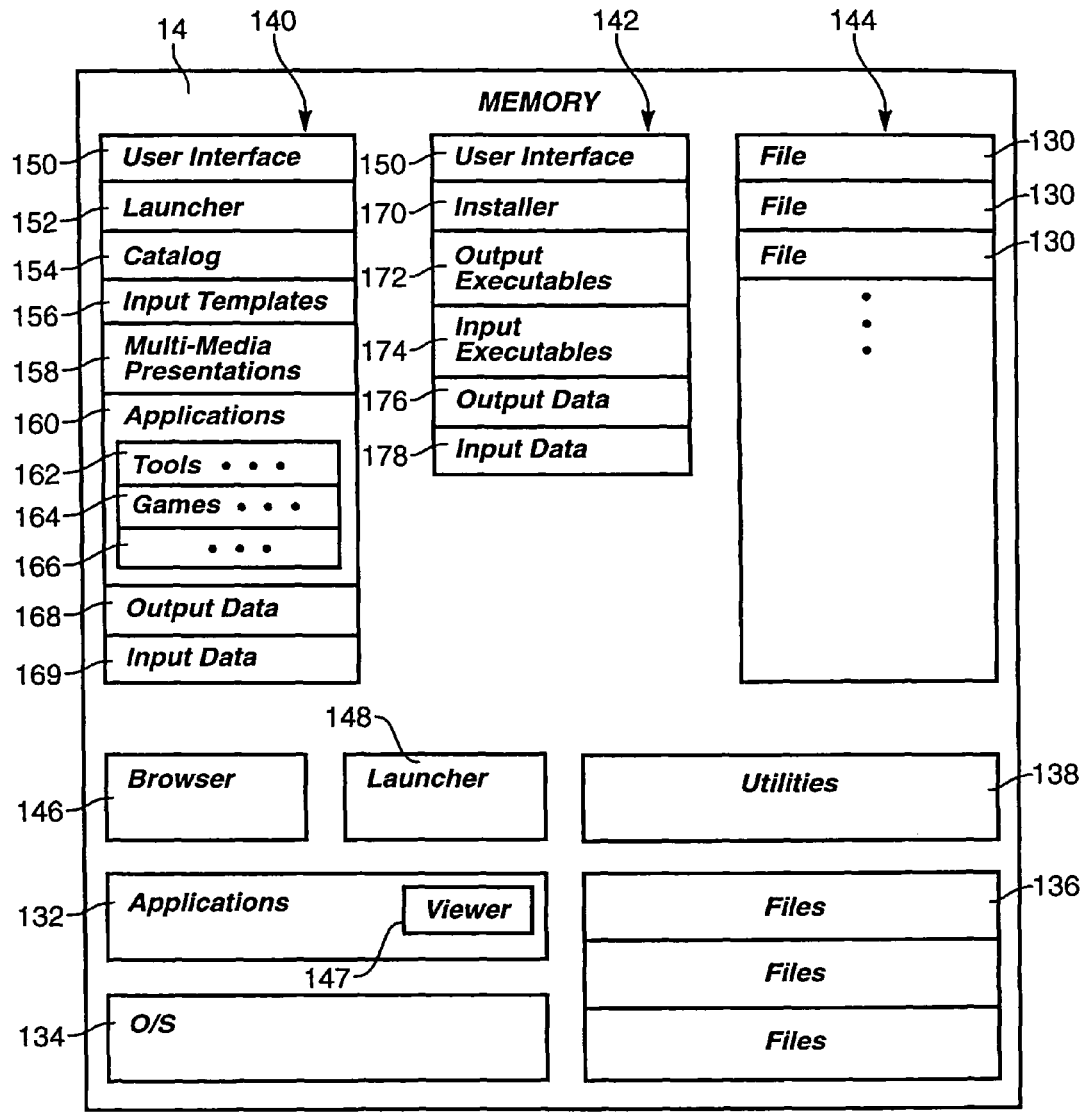
FIG. 6 is a schematic block diagram of data structures for selected embodiments of a method and apparatus in accordance with the invention, hosted on a computer of FIGS. 1-2.

Referring to FIG. 6, various data structures may be hosted by a workstation 64 before and after loading the CD-ROM tag 60. In certain select embodiments of an apparatus and method in accordance with the invention, the CD-ROM tag 60 may contain only files 130. The files 130 may require applications 132 existing completely independently from the CD-ROM tag 60. As a practical matter, various browsers 146, launchers 148, viewers 147, and the like exist in various distribution channels. Thus, the CD-ROM tag 60 may actually contain only non-executable data requiring other executables (such as applications 132, browsers 146, viewers 147, and watchers 148, and utilities 138. etc.).

Referring to FIG. 6, files 130 may be installed in a memory device 14 of the apparatus 10 in accordance with the invention. Typically, the memory device 14 of FIG. 6 may be embodied as the RAM 20 of the workstation 64 of a user. In general, the memory 14 may be loaded with applications 132 of a user, independent of the CD-ROM tag 60. Likewise, an operating system 134 and files 136 associated with the operating system 134 and application 132 reside in the memory 14.

Software 140 provided on the CD-ROM tag 60 may include specific executables that are simply run from the CD-ROM tag 60. Alternatively, software 144 may actually be installed from a CD-ROM tag 60 into a memory device 14 that has non-volatile storage capability, such as a hard drive 16. Thus, during execution, the memory device 14 is typically the RAM 20 of the workstation 64, whereas installation and storage typically involves a hard drive 16 at a workstation 64.

In certain selected embodiments, software 144 may rely on a browser 146 already installed previously and otherwise usable by a user of the workstation 64. Thus, the browser 146 may be thought of as "organic" to the workstation 64. That is, the browser 146 is previously installed for other functionality desired by a user. Similarly, a viewer 147 may be an organic application 132 previously installed, but relied upon by the software 140, 142, 144. Similarly, a launcher 148 or loader 148 may operate in a workstation 64. Similarly, various utilities 138 are typically installed on a workstation 64. Likewise, various files 136 associated with the applications 132 are hosted thereon. During operation of any particular application 132 the application 132 is loaded into RAM 20. Similarly, portions or complete files 136 may be loaded into RAM 20. Otherwise, applications 132 and corresponding files 136 may be stored on a storage device 16 such as a hard drive.

In another embodiment, or additional improvement to previous embodiments, a user interface 150 may be an executable provided by the CD-ROM tag 60. The user interface may supplant, cooperate with, or substitute for the lack of, a browser 146 or other application 132, such as a viewer 147.

A launcher 152 may provide an independent launching mechanism adapted to software 140 provided by the CD-ROM tag 60. Nevertheless, a launcher 152 may simply exist for the user or purchaser who does not have a launcher 148 organic to their workstation 64.

One particularly valuable product provided by the CD-ROM tag may be a catalog 154. As a practical matter, the catalog 154 may actually be a multimedia presentation of product information. The catalog 154 may include data, search engines, records, pricing information, visual presentations, audio presentations, user information for sizing or selecting products and the like.

Another important feature that may be provided to a user is input templates 156 for providing information to applications 160 provided. For example, a user may determine to select a rack for holding sporting goods on top of an automobile. Alternatively, a user may select clothing such as hats, shoes etc. Accordingly, input templates 156 may provide user information or request user information inputs which may be used to direct a user's search in a catalog 154 to those particular products that would be suitable for the user in view of the information provided by input templates 156. Currently, a user must navigate information provided by vendors and suppliers of products and services. By providing certain input templates 156 the quantity of information could be automatically filtered in order to provide to a user only those selections of information that need to be considered. The input templates 156 may provide for storage and maintenance of user inputs over the mere section in which an application 160 or catalog 154 is executing, or may store the information for longer term usage. In certain selected embodiments, the software 140 may actually provide a "concierge" or valet function by maintaining over a long period of time a collection of useful information. Thus, a user need not document catalog purchases, styles, sizes, or the like, but may instead have such information maintained automatically as input by the user directly in response to input templates 156, or as a result of direct inputs provided by a CD-ROM tag associated with a particular product purchased by a user.

In certain embodiments, included with any catalog 154, or independent therefrom, a multimedia presentation 158 may present information to a user. The multimedia presentation 158 may be configured as entertainment to engage a user. Alternatively, the presentation 158 may be a portion of a catalog 154. In certain embodiments, the multimedia presentation 158 may take the form of qualification testing, or the like. Any presentation 158 that may engage a user, may also collect information, if desired. Thus, sophisticated profiling may result from responses of a user to a multimedia presentation 158.

In general, applications for any particular function desired by a vendor may be provided as part of the software 140 of the CD-ROM tag 60.

Advertising specialties are typically engaging or useful products that bear the name, identifying information, location, and so forth of a vendor. Thus, various utilities and tools that may have particular application to a user for managing computer systems, managing information, and the like may be provided as tools 162 or utilities 162 in a software package 140. As a practical matter, the advertising industry is much larger than the software industry. Accordingly, a vendor may well decide to provide various software tools 162 or utilities 162 at no charge, in order to provide more access of impressions from the vendor to a user on the user's workstation 11, 64.

Another feature that is often regarded as highly desirable by a user is games 164. Games 164 that use national trademarks, well-recognized characters, or game schemes, or the like may be provided in the game 164. Again, the games 164 may themselves include multimedia presentations 158 and may provide direct or indirect input templates 156.

Other software 156 may be provided for any of a host of purposes that may be desirable by a vendor or a user. Other software 166 may include, for example, tests, skill evaluations, any interactive exchange of information, or the like that may be useful to the user or the vendor. The results of such other software 166 may be stored for only a session or may be stored for some period of time for use at a later time by either a vendor or a user, in accordance with authorizations by each or either one.

Output data 168 and input data 169 may be viewed from the point of view of the CD-ROM tag 60, a user, or a vendor. Regardless, various inputs or various applications 160, presentations 158, including the catalog 154, and so forth, may be independent of the application 160 or executables. Thus, the outputs 168 and inputs 169 may be perceived to contain data used by the executables of the software package 140, as well as information that may be provided to a user. Also, the output data 168 and input data 169 may include data in addition to the data provided by the CD-ROM tag 60. For example, certain of the data 168, 169 may be those items of information provided in response to the input templates 156, which information may be provided, at the user's discretion back to vendors for the purpose of purchasing, selecting, reporting, registering, or the like, products or purchases.

In certain embodiments, software 142 may actually be installable on a non-volatile storage device 16 of a workstation 11, 64 of a user. Thus, an installer 170 may actually be provided on the CD-ROM 60 or independently therefrom.

Output executables 172 may provide data from a user back to a vendor. Meanwhile, input executables 174 may provide for collection of information from a user. Part of the user input executables 174 may actually be pre-programmed data provided by a vendor in association with a CD-ROM tag 60. Accordingly, the input executable 174 may actually report input data 178 already on a CD-ROM tag, identifying product purchases. However, the most useful input data 178 to a vendor may be the product information available on a CD-ROM 60 in association with inputs from a user regarding personal preferences and purchasing patterns. Again, the relationship between input data 178 and output data 176 may be considered with respect to a user, or with respect to the executables 172, 174 or may be considered with respect to a vendor or with respect to a user workstation 11, 64. Thus, one need not be locked into any one frame of reference. Nevertheless, the inputs 178, and outputs 176, in general will provide information for transfer to and from executables 172, 174 hosted on a user workstation 11, 64, and may provide information back to a vendor base computer 68. A significant benefit of a CD-ROM tag 60 is to provide for the needs of a user and the needs of a vendor in exchanging information. Accordingly, a vendor more easily satisfies the needs of a user or a purchaser by virtue of the available data 176, 178, while a user can selectively authorize transmission of various data 174, 176 to and from a vendor base 68 or even an independent third party server 66 according to only those authorizations selected by a user.

Thus, in one embodiment, the software 140, 142, 144 may represent alternative mechanisms for collecting information and storing the same for the user. Similarly, the information may selectively, at a user's discretion, be transmitted from the user workstation 11, 64 to a vendor base 68 at a point of purchase or a time of purchase. Most users are happy to provide necessary information to size or otherwise select purchases. Information provided to a vendor may then be discreetly used by the vendor in order to better capture demographic information correlating products, advertising campaigns, sales, and the like, together.

Figure 7:
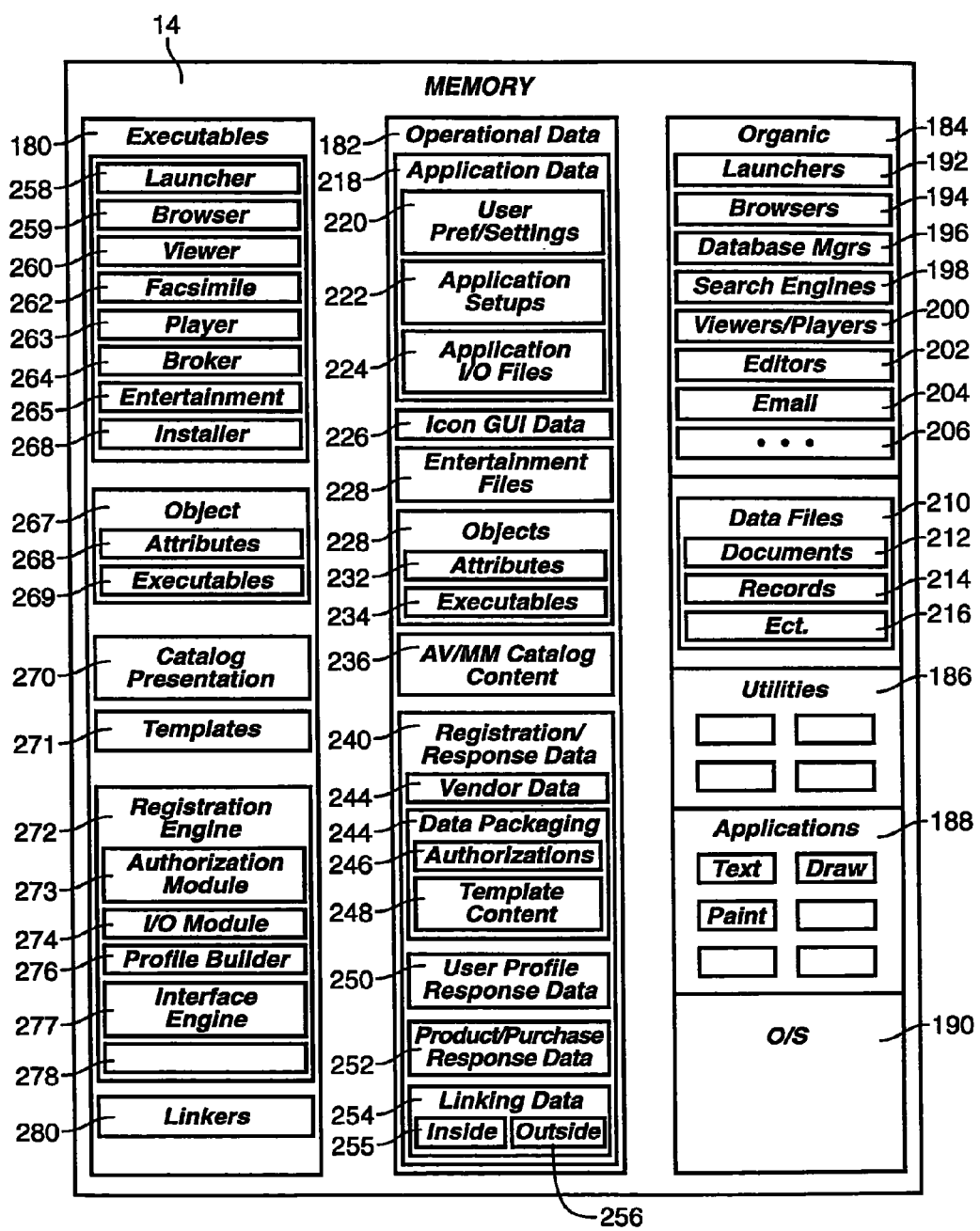
FIG. 7 is a schematic block diagram of additional details that may be incorporated in the memory of FIG. 6, or in addition thereto.

Referring now to FIG. 7, additional and alternative details of embodiments in accordance with an apparatus and method of the invention may include executables 180, operational data 182 (non-executables) and organic data 184. The term "organic" as used herein reflects the military concept of installed systems that are part and parcel of a particular organization or operation. In this instance, the organic data structure 184 reflect those software and file structures that are installed or inherent on a user workstation 11, 64 independent of the CD-ROM tag 60. Nevertheless, the organic data structures 184 may be executable in order to access or use operational data 182 provided by the CD-ROM tag 60.

Typically, a memory device 14 of a user workstation includes various utilities 186 for performing the necessary functions or desirable activities associated with the "care and feeding" of the user workstation 11, 64. Typically various applications 188 provide functional abilities for a user. For example, Internet access, browsers, text editors, painting and drawing programs, word processing, financial programs, and the like are various applications 188 hosted by a user workstation 11, 64. Likewise, games, e-mail, and other applications 188 or programs 188 are becoming ubiquitous by public domain software, shareware, commercial software, and the like.

The applications 188 operate "on top of" an operating system 190. Of course, the utilities 186 may operate with applications 188, or may operate as applications themselves on the operating system 190.

Many workstations 11, 64, and sometimes operating systems 190 themselves, include launchers 192 for launching applications 188. Browsers 194 are ubiquitous. A selected few browsers are nearly universally installed. Thus, a browser 194 organic to a workstation 11, 64 may actually be presumed to be one of a very few types. Thus, the CD-ROM tag 60 need not include a browser 194, since a browser 194 may be presumed to be installed, so long as the selected few browsers are supported.

Database managers 196 likewise are of several types. To the extent that a database manager 196 already exists, a user may elect not to use or may not need any type of a storage and retrieval engine other than a database manager 196 organic to the workstation 10, 16. Search engines 198 may be embodied in database managers 196 or browsers 194. Alternatively, other search engines may also exist as a result of various needs or applications available to a user. Likewise, certain search engines 198 are available over the Internet and need only be accessed by internet client software.

Viewers 200 or players 200 are again ubiquitous. The names are well known and the multimedia presentations players 200 are well documented. Any one of such viewers 200 or players 200 may exist as an organic software article on a workstation 11, 64. Editors 202 or at the higher end, word processors 202 are likewise ubiquitous and well documented, while being limited to only a few major players. E-mail engines 204 exist as does other software 206. Accordingly, a user may document, or the operating system 190 may provide, an identification of the typical organic software suite 192, 206. To the extent that a user wants to be spared the tedium, the executables 180 may themselves determine the organic software suite 192-206, thus obviating the need to install specialty executables unique to the CD-ROM 60. Nevertheless, executables 180 may be provided in order to deliver to a user the full content of a CD-ROM tag 60, without requiring any particular software suite 184.

Associated with the software 192-206 may be various data files 210 taking the form of documents 212 records 214 or other files 216. Again, the storage format of the data files 210 will depend upon the software creating them. The executables 180 and operational data 182 may conform to the data files 210.

In certain embodiments a CD-ROM tag 60 may include only operational data 182 and no executables 180. Typically, an operating system 190 with various utilities 186 can protect against viruses. Nevertheless, some reluctance to load executables 180 may be avoided by providing only operational data 182 on a CD-ROM tag 60, to be executed by the organic software 184 of a users individual workstation 11, 64. Nevertheless, since a CD-ROM tag 60 comes from a responsible supplier, and is in a format not available for tampering, the executables 180 may be loaded with confidence.

Nevertheless, for saving space on a CD-ROM tag 60, operational data 182 may consume considerably less space than certain executables 180. Nevertheless, again, when discussing audio data or visual data, particularly animated data, the operational data 182 may grow to substantial size.

In certain embodiments, application data 218 may include user preferences or user settings 220. Most applications provide for such information tailored to a user's needs. Again, the operational data 182 may correspond to the organic software 184, or the new executables 180 installed as a result of the CD-ROM tag 60. Applications 188 may have their own individualized data peculiar, not to a user, but to the application 188. Accordingly, application set up data 222 or setups 222 may be provided as temporary or permanent configuration data controlling the use and access to applications 188. Of course, the operational data 182 may all be applicable to the executables 180, as well. Application files 224 may be required data, or it may be the stored files 224 resulting from execution of an application 188, 180.

Certain graphical user interface data 226 or icon data 226 supports ready access by a user to applications 188, 180. Entertainment files providing images, operational data, scenarios, conditions, and the like for various gaming applications or other entertainment executables 265, 188 may be a major portion of the operational data 182 provided in a CD-ROM tag 60. For example, new game scenarios, music, sound bites, presentations, video animations, and the like may form a substantial entertainment file 228 of interest to a user, and useful by an executable 180, 188 of a user workstation 11, 64.

In certain embodiments, operational data 182 may be embodied in an object 230 or various objects 230. Objects 230 may include strictly attributes 232 or may include sufficient executables 234 embedded in the object 230 in order to provide access by a user to the attributes 232.

An audiovisual or multimedia catalog content 236 may execute with an application 184 or an executable 180 such as a catalog presentation 270. Again, catalog content 236 may be a major benefit to a vendor as well as a desirable benefit to a user. Moreover, if the catalog content 236 may be filtered according to user preferences, and presented in a dynamic and engaging format, the catalog content 236 may have great commercial value to a vendor and to a user in providing targeted messages to a desiring audience.

One major benefit to CD-ROM tag 60 may be the facilitation of registration data 240 or response data 240 from a user back to a vendor. The data 240 may be provided from a user workstation 11, 64 to a base computer 68 of a vendor, or to a centralized server 66. In certain embodiments, a user may have few qualms about providing information from a workstation 11, 64 to a base 68 over an internetwork 50, knowing that the base 68 is controlled and owned by a specific vendor under an agreement with the user not to provide user data elsewhere. Alternatively, in certain embodiments, a base 68 or a user 64 may provide to a third party server 66 certain information. However, user response data 240 may be protected to any extent desired by a user and a vendor. Accordingly, a vendor may obtain valuable and specific targeting data so long as the vendor agrees to maintain such data in confidence. For example, a user may desire repeatedly to purchase certain selected brands of clothing. The user may likewise have no qualms about providing sizing data, purchases, style information, and the like to a vendor. However, many users might have a great objection to having such information generally available to random purchasers of targeting information. Accordingly, the registration data 240 or response date 240 may provide user options for the generalized availability of personal data.

The data 240 may include vendor data 242 taken directly from the CD-ROM tag 60 or provided by a user. Vendor data 242 may be selected by a vendor and embedded on the CD-ROM tag 60.

A data packaging module 244 may contain information such as authorizations 246 permitted by a user. Likewise, any questions or templates that fill out database records for a vendor may be contained in the template content 248. The data packaging module 244 may thus provide personal information in the template content 248, bound to certain selected and limited authorizations 246. The authorizations 246 may have the effect of filtering the availability of the template content 248 to a vendor or various vendors. Thus, the authorizations 246 may provide to a user great comfort and great control over the distribution of targeting information.

User profile response data 250 may be provided directly or indirectly from a user workstation 11, 64. In general, the user response data or the profile data 250 represents information of value to the vendor, and only available from a user.

Product response data 252 or purchase response data 252 may be provided by a user, by the CD-ROM tag 60 itself, or both. Depending on a user's willingness to respond to questions, certain product data 252 may be provided. However, since a vendor controls the manufacture of the CD-ROM a vendor can place information in as much detail as desired on a CD-ROM tag 60. Thus, a CD-ROM may simply be a generalized CD-ROM tag 60 associated with a vendor. Alternatively, a CD-ROM may be produced in versions which are specific to a style, color, stock number, sales distribution outlet identification, or the like. Just as labeling on products may be specific to a style, color, and the like, a CD-ROM tag 60 may be so specific. Alternatively, a vendor may produce CD-ROM tags 60 having certain product data 252, and providing rapid template inputs or selections of other details. For example, a style may be indicated by the data 252 provided directly to the CD-ROM. Other response data 252 may involve user selection of color, size, or the like. Thus, the CD-ROM tag 60 contains the style information and vendor information and perhaps certain distribution information, whereas the response data 252 provided by a user directly may include color, size, and additional purchase point information.

Linking data 254 may be inside linking data 255 or outside linking data 256. Inside linking data 255 may be thought of as binding information linking, for example, products and purchase response data 252 with user profile and user response data 250. Inside linking data 255 may include authorizations 246 linking to selected content 248 obtained from templates. Thus, the inside linking data 255 may be quite specific, and quite controlled. By contrast, the outside linking data 256 may provide information necessary to link as seamlessly as possible the user workstation 11, 64 to a vendor base 68 or third party server 66. Thus, for example, the outside linking data 256 may provide addresses and sets of information for ready engagement of a browser 194 or viewer 200, or even e-mail 204. The CD-ROM tag 60 may facilitate a very rapid, user-friendly, and transparent link back to a vendor.

To the extent that a user station 11, 64 does not contain a specific, required article of organic software 184, an executable 180 may be provided for the function. As a practical matter, a launcher 258 may not be necessary if launchers 192 are organic. Launchers 192 are often embedded in operating systems 190.

Nevertheless, to the extent that they are not available as organic software 184, a browser 259, a viewer 260, and e-mail program 261, a fax sending or receiving program 262, a player 263 for audio, video, or other data, or a broker 264 for accessing any of the applications 258-263 or any of the applications 192-206 may be provided on the CD-ROM tag 60. The functionality of each of these applications 192-206 and applications 258-263 are clear from their names or titles.

A broker 264 may be thought of as a user interface for selecting and engaging a particular executable 258-263 or application 192-206 on behalf of a user. Thus, a broker 264 may effectively navigate between various applications or executables seamlessly, with a minimum of interruption and input by a user.

Entertainment 265 may be a major draw for certain classes of users. Accordingly, proprietary, novel, or licenced entertainment 265 may take the form of music, videos, demonstrations, education, games, skill tests, and the like. Entertainment 265 may be interactive to provide user information.

An installer 266 may or may not be required depending on the particular nature of executables 258-265. Again, an installer 266 may be obviated by the presence of an installer 266 in association with the organic software 184 when purchased. Alternatively, to the extent that an installer 266 is necessary to install or uninstall executables 180, the installer 266 may be provided on the CD-ROM tag 60. Since so many applications share libraries, the installer 266 may be necessary in order to obtain the security and the access needed for proper set up of a user workstation 11, 64.

As discussed above, executables 180 may take the form of objects 267, wherein sufficient attributes 268 to operate certain executables 269 are provided within the object 267. Alternatively, the attributes 268 may be significant and a result of user inputs to access the executables 269. Thus, the comparative size and significance of the attributes 268 and executables 269 need not be prejudiced in favor of either one.

A catalog presentation 270 is an executable 180 for presenting a catalog. The catalog presentation 270 may have data contained therein, but may preferably be only the executable 180 with the content 236 exchangeable. Thus, a single catalog presentation executable 270 may be provided on a single CD-ROM tag 60. Later on, additional CD-ROMs may change content 236 or add content 236 that may still be accessed by the single original catalog presentation executable 270.

Similarly, templates 271 may provide input formats, questionnaires, record styles, and the like. Templates 271 may be animated to be more engaging. The templates 271 may be nested series of numerous question fields that are automatically filtered according to previous answers. Accordingly, the templates 271 may be quite sophisticated. However, as with the catalog presentation 270, the templates 271 may benefit from having the executables 271 separate from the vendor date 242, data packaging information 244, user profile date 250, or product data 252 separately stored.

The registration engine 272 may represent the executable portion 272 designed to provide the registration response date 240. For example, the authorization module 273 may provide the questions, explanations, and controls, or may use the information provided for, the authorization 246. Thus, the authorization module 273 may be thought of as the executable 273 responsible for generating, using, or both, the authorization data 246. Similarly, an I-O module 274 may provide the connection mechanism for using the linking data 254 in order to input or output data generated by the registration engine 272.

A profile builder 276 may be simple or sophisticated. The profile builder 276 may be thought of as executable 180 responsible for providing user profile data 250. Profile builder 276 may also provide linking between user profile and response data 250 and the product of purchase response data 252. Thus, the profile builder 276 may provide data 250, 252 as well as linking data 254.

An inference engine 277 may be hosted in a user workstation 11, 64 or may be hosted in the base 68 to be operated on the base CPU 12, or may be hosted in the CPU 12 of a server 66. In general, the inference engine 277 may actually be a rather sophisticated and complex software module 277. Accordingly, the inference engine 277 is typically a portion of a vendor's analysis tools. Linkers 280 may be incorporated within the profile builder or registration engine, but may also be outside. As a practical matter, linkers 280 may be associated with a broker 264. That is, in general, the linking data 254 is created to be used. Some engine must use the linking data in order to make the links between operational data 182, or between a user workstation 11, 64 and a vendor base 68 or server 66. Thus, the linkers 280 may be embodied within the broker 264, or may be accessed by the broker 264. In certain embodiments a browser 259 may obviate the need for a broker 264 or linkers 280. On the other hand, the engines that form and manage the links back to a vendor, may be provided by the linkers 280. Other executables 278 may serve additional functions requested by a user or a vendor.

Figure 8:
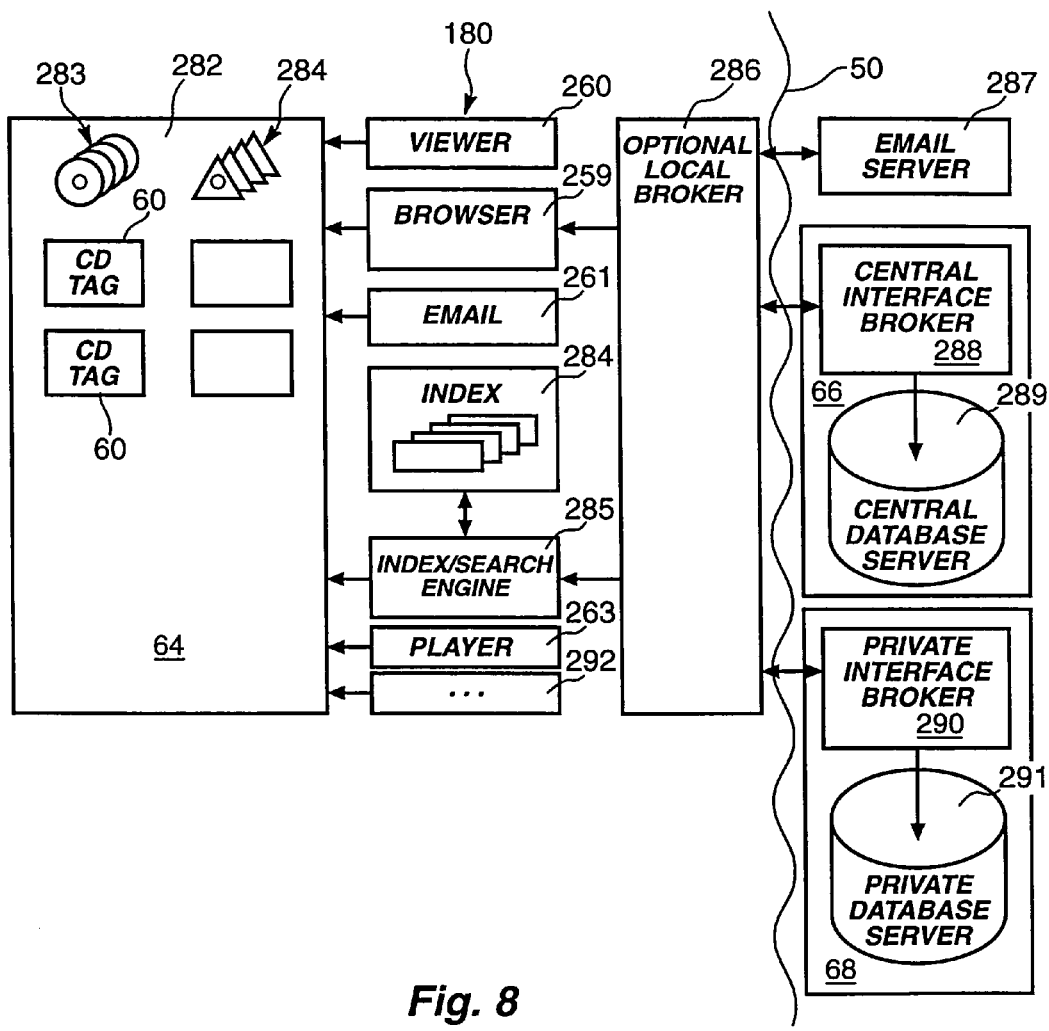
FIG. 8 is a schematic block diagram of an interaction scheme including software engines and data repositories for implementing an apparatus and method in accordance with certain embodiments of the invention.

Referring to FIG. 8, a collection 282 of CD-ROMs 60 may actually involve the electronic series 283 or indices 284 of the content of multiple CD-ROM tags 60. For example, CD-ROMs 60 may contain substantial amounts of information that a user does not desire, in general, to store on a storage device 16 in a user station 11, 64. Accordingly, the collection 283 or the index 284 may simply be responsible to provide sufficient linking information to readily access information on CD-ROMs 60. Alternatively, certain specific information may be stored in the collection 282, with the more massive information on CD-ROMs 60. In certain embodiments, the CD-ROMs 60 may be dispensed with and the indices 284 may provide links back to a web site 68 or base 68 from which updated information from executables 180 or operational data 182 may be downloaded to a user on demand. Thus, the CD-ROM may contain the initial information and setup involved, while the actual content (e.g. operational data 182) may be updated and downloaded automatically or in response to user requests.

Interactions illustrated in FIG. 8 between the user workstation 64 and the base 68 or other server 66 need not go outside the browser 259, viewer 260, player 263, or search engine 285. That is, the collection 282 may be accessed from within the single computer 64, without access to an internetwork 50 to contact the base 68 or server 66. An actual index 284 of the content of the collection 282 may be provided and searched by the indexing and search engine 285. The indexing and searching engine 285 may be thought of as the database engine maintaining a database 284 of index information related to the content of the collection 282. Access to the collection 282 may be obtained by one or more of the browser 259, 260 engine 285, and player 263, or other access software 292. In certain embodiments, e-mail 261 may be used to access the information 282 and forward it to another location. Typically, a browser 259 or e-mail 261 may have immediate access over an internetwork 50 to other servers 66, 68.

An optional local broker 286 may navigate between the available applications 180 or executables 180 including the browser 259 e-mail 261, and the like. However, the local broker 286 is strictly optional. For example, a browser 259 or Internet browser 259 may access the collection 282 and provide date back to the server 66 or the base 68 and vice-versa. Nevertheless, a broker 286 may be configured as described above in the broker 264 of FIG. 7. The broker 286 has a function of integrating, if desired, and providing a user interface that does not demand of a user continual switching between, or worse, launching and exiting, various application software. As illustrated in FIG. 8, the user workstation 64 may provide or acquire information from the central database server 289 by means of a central interface broker 288. That is, the central interface broker 288 may cooperate with the local broker 286, or in the absence of a local broker 286 may cooperate directly with a viewer 260 or browser 259. Alternatively, a user may access directly a private database server 291 in the base 68, with or without a private interface broker 290. The purpose of the brokers 288, 290 may be designed by a vendor or a third party. However, in order to facilitate ease of access to servers 66, or the actual data stores 289 and server 68, including the actual data stored 291, information must be transported in a format recognizable and useful by a controlling executable. Since an individual user may have a workstation 64 having a viewer 260, a viewer may be the only mechanism available to access the collection 282 of CD-ROM tag information, and update it. Alternatively, some internet browsers 259 may be available. In some instances, only e-mail 261 is available. Likewise, only some database management engine 285 or some particular player 263, such as a multimedia player, or the like, may be available. Accordingly, the availability of brokers 286, 288, 290 may be optional. However, the brokers basically can facilitate interaction by repackaging information according to different protocols in certain instances. Thus, the brokers 286, 288, 290 may all be optional. However, a third party controlling the server 66 may desire to have a central interface broker 288 in order to accommodate more information in more formats for more sources. Likewise, a vendor of products, by controlling the base 68 or base server 68 may desire to have a private interface broker 290 in order to facilitate access to information and receipt of information in a variety of formats.

Effectively, in the system of FIG. 8, operating with the hardware and software configurations of FIGS. 1-7, may exchange information between a central third party controlling a server 66, a vendor controlling a server 68, and a user controlling a workstation 64.

The database stores 289, 291 may contain information obtained from user workstations 64 with user authorizations. Accordingly, the users may request by pulling information and vendors may push by providing, according to user authorization, data from the data stores 289, 291. Thus, a free flow of targeted product information to user workstations 64 filtered according to user desires and profiles is facilitated.

Figure 9:
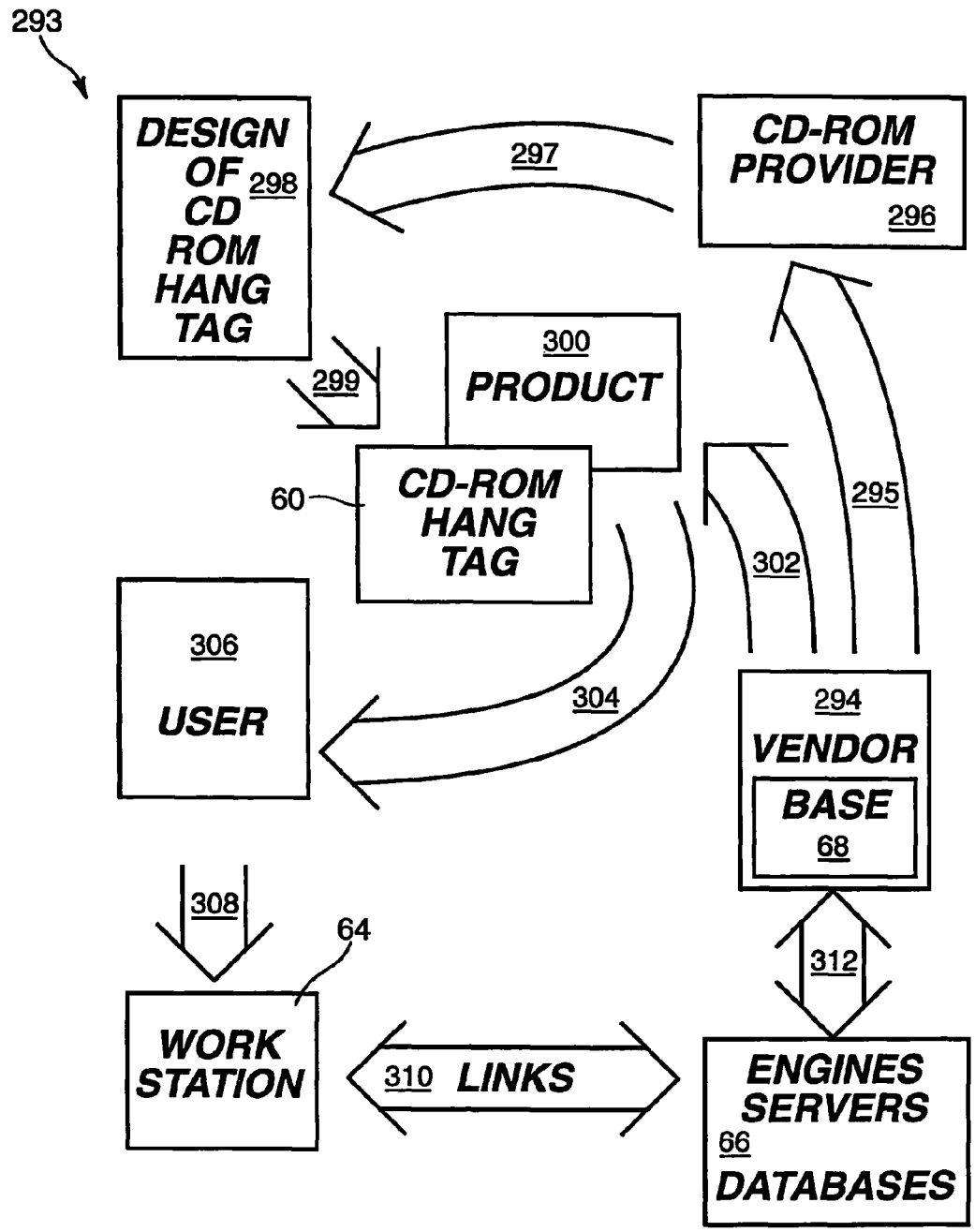
FIG. 9 is a schematic block diagram illustrating the data flows in an apparatus and method in accordance with the invention.

Referring to FIG. 9, an apparatus and method in accordance with the invention may be implemented by a system 293 or method 293. In one embodiment, a vendor 294 controlling a base 68 or base server 68 may provide 295 the information required by a CD-ROM provider 296 in order for the CD-ROM provider 296 to construct the operational data 182 and executables 180 of FIG. 7. As a result, the CD-ROM provider 296 delivers 297 or provides 297 a design 298 for the CD-ROM hang-tag 60. The design 298 may include both graphic design and software architecture as well as data structure architecture for the operational data. The CD-ROMs 60 are then provided 299.

Meanwhile, a vendor 294 provides 302 product 300 to be associated with the CD-ROM tags 60. The CD-ROM tags 60 may be attached to the product 300 by any suitable means, including tethering, adhesives, packaging, and the like. Thus, the CD-ROM tag 60 is associated with the product 300 for delivery 304 to a user 306. The user 306 separates the CD-ROM tag 60 from the product 300 and installs 308 the CD-ROM tag 60 on the workstation 64.

As described with respect to FIGS. 1-8, the workstation 64 may then establish links 310 with the server 66 which may include engines, servers, databases, and the like as described above. Similarly, the workstation 64 may establish links 310 with the base 68 or base server 68 associated with the vendor 294. Accordingly, the workstation 64 may obtain data from the servers 66, 68, and deliver data to the databases of the servers 66, 68.

Figure 10:
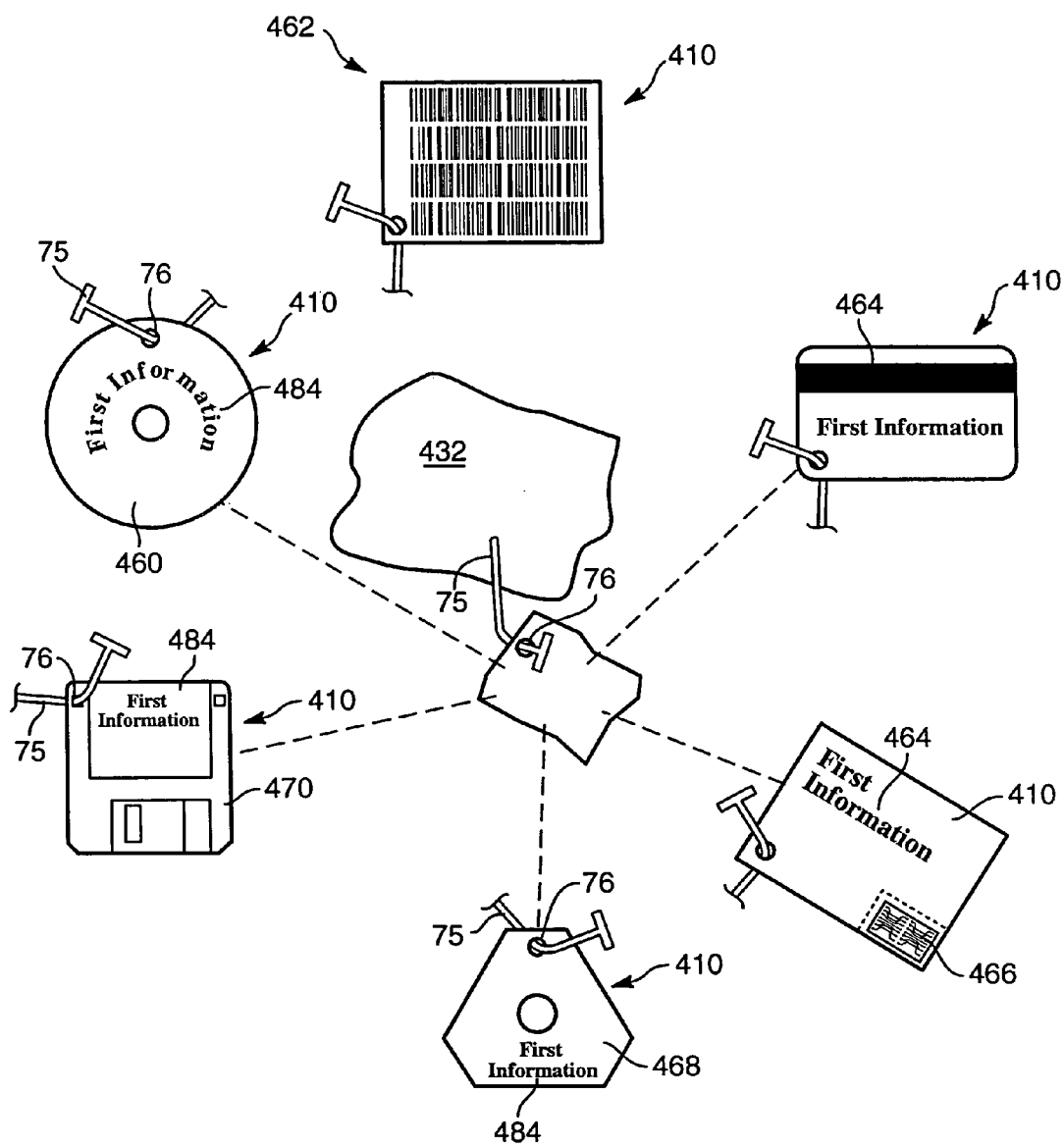
FIG. 10 is a schematic illustration of various embodiments of computer-readable media in product labels in accordance with the invention.

Referring now to FIG. 10 another embodiment of the invention is presented as a user-computer-readable medium imbedded in a product label 410 (herein the label). The label 410 may be configured to be a hang tag as the term is used in the clothing and retail industries, any hanging tag configured to be attached to a product using a tether 75, or any tag configured to be attached to a product in any other manner.

Penetrations 76 may be provided with tethers 75 for connecting a label 410 to various products. For example, in the clothing industry, various types of tethering mechanisms have been developed to facilitate automatic insertion of securement mechanisms with minimum labor and minimum cost. Nevertheless, alternative embodiments may operate independent of the tethers 75.

Referring to FIG. 10 while continuing to refer generally to FIGS. 3-5, the label 410 may be substituted for CD-ROM tag 60. Accordingly the label 60, 410 is formed to display on an outer surface 434 information 484. The information 484 may include facts about the product and facts about the source of the product. Information 484 may be conveyed directly through the use of printed words, symbols, trade marks, service marks, pictures, and the like. The information 484 may also be conveyed through the selection of the color or shape of the label 410. The information 484 may include a product name, brand name, vendor name, or other name 78, vendor identification 80, slogans 82, messages 84, other marks 86 or trademarks 86, logos 88, and images 90 or symbols 90.

In general, a shape 92 or an edge 92 may also provide the information 484. Any shape that will still function with a drive 62 may be suitable. In certain embodiments, a label 60, 410 may have vertices 94 or corners 94. As a practical matter, a label 60, 410 may be the standard shape for the particular medium or formed in a variety of shapes as illustrated in FIGS. 3-4 and 10.

A computer-readable medium product label 410 may be substituted for the CD-ROM tag 60. Accordingly, if an optical medium, such as CD-ROM 460, or DVD 468, is selected, the label 60 may be of any suitable arbitrary weight-balanced configuration. For other types of media such as a floppy disk 470, an industry-standard size, shape, or both may be dictated. A tether 75, secured through a penetration 76, may secure the label 60 to a product. As a practical matter, penetrations 76 may be distributed in a balanced fashion to prevent even small variations in the balance on a label 60, 410, particularly if the label 410 is a CD-Rim 460 or a DVD 468.

In one embodiment, the choice of a computer-readable medium may include an optical medium such as a DVD 468 or CD-ROM 460. In other embodiments, the computer-readable medium may include a magnetic medium such as magnetic strip 464 or floppy disk 470. In other embodiments, the computer-readable medium may be a symbolic code such as a bar code 462. In yet other embodiments, the choice of a computer-readable medium may include firmware 366 such as a card with an embedded chip.

The computer-readable medium couples to the tag 410 other information 486 in a computer-readable format. The information 486 of the label 410 may be configured, selected, and operable the same as the various software 140, 142, and 144 corresponding to the CD-Rom hang tag 60 in FIG. 6. The information 486 may also correspond to the executables and operational data 182 of the CD-Rom hang tag 60. Accordingly, the information 486 may include product facts, source facts, new product facts, service facts, a game, a data gathering interface, a test, a browser, a launcher, or the like and a network identifier (e.g. address, URL) corresponding to a location where additional information may be available.

Referring again to FIGS. 8-9, the collection 282 of media tags 60 may also be a collection 282 of labels 410, each capable of all the uses and functionality thereof The process system 293 or method 293 may apply to labels 410 as well as to media tags 60. A computer-readable medium embodied in product a label 410 may perform as a CD-Rom tag 60 or other media tag 60.

Figure 11:
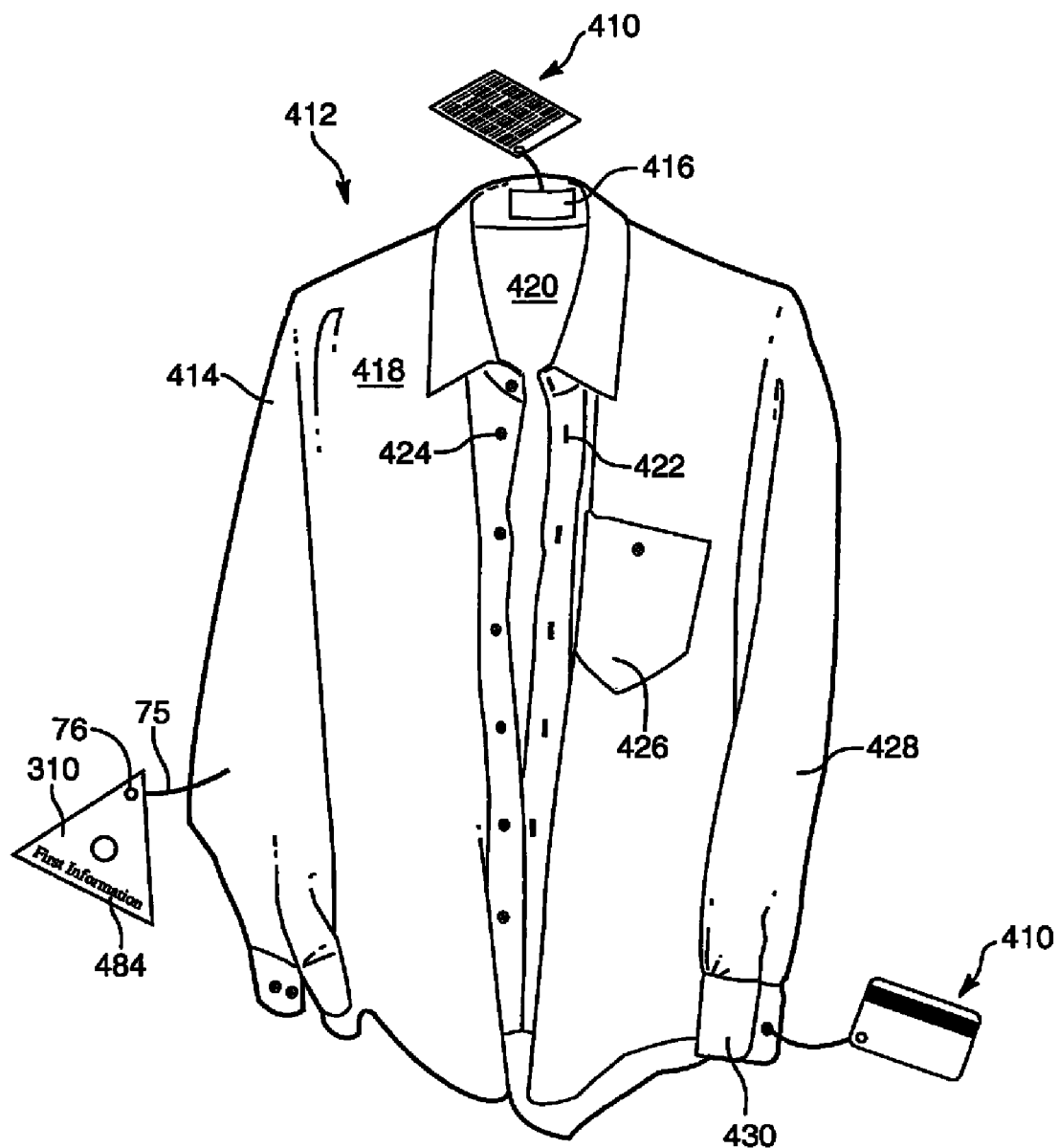
FIG. 11 is a perspective view of an example of a product with attached labels in accordance with the invention.

Referring to FIG. 11, a product 412 is illustrated with labels 410 attached at various locations. In the illustrated embodiment, the product 412 is a garment 414. Many currently available computer-readable media are fragile and require some degree of padding or other protection during shipping. For this purpose, the garment 414 is a suitable product 412 to be packaged in conjunction with the label 410. The garment 414 may be made of soft, cushioning fabric that will protect the label 410 during packaging, handling, shipping, and display of the product 412 prior to purchase by a consumer.

The garment 414 has an associated exterior 418 and an interior 420. Depending on the type of garment 414, other features of the garment 414 may include an attached tag 416, a button 422, a button hole 424, a pocket 426, a sleeve 428, a cuff 430, and the like. A tether 75 may attach the label 410 to the garment 414 at any of the previously mentioned features or at other locations where ever labels may be serviceably attached by manufactures and retailers.

Figure 12:
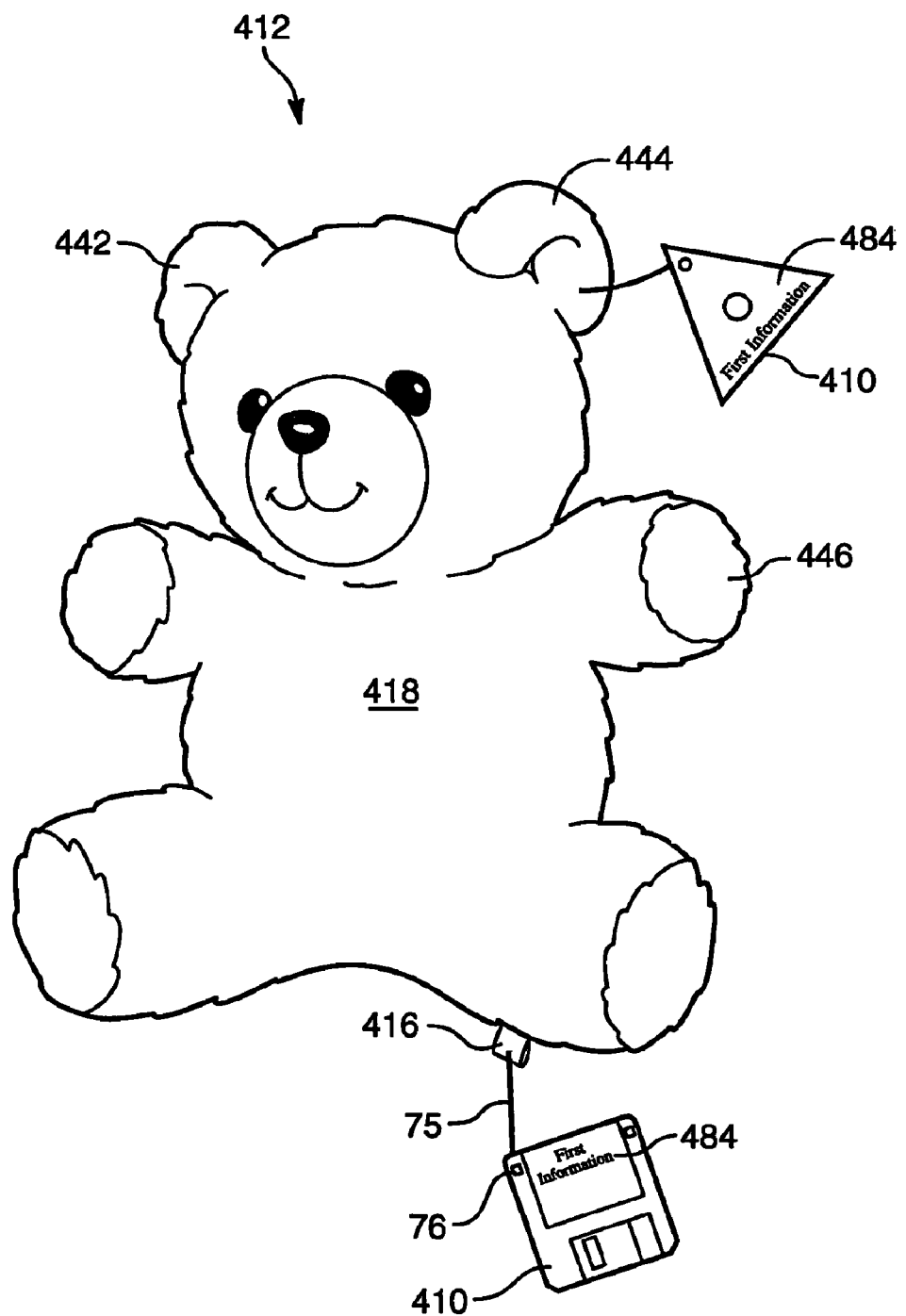
FIG. 12 is a perspective view of another example of a product with attached labels in accordance with the invention.

Referring now to FIG. 12, another embodiment of a product 412, may be a toy 440. A toy 440 may be a stuffed animal 440 as shown or any other type of toy 440. A stuffed toy 440 may provide the same beneficial padding and protection for the label 410 as the garment 414.

A toy 440 may have one or more features significant for tagging, such as, for example, an appendage 442, an ear 444, an exterior surface 418, an arm 446, an attached fabric tag 416, or the like for receiving the label 410. The label 410 may be attached to the toy 440 by a tether 75 secured at any of these or other accessible features.

Figure 13:
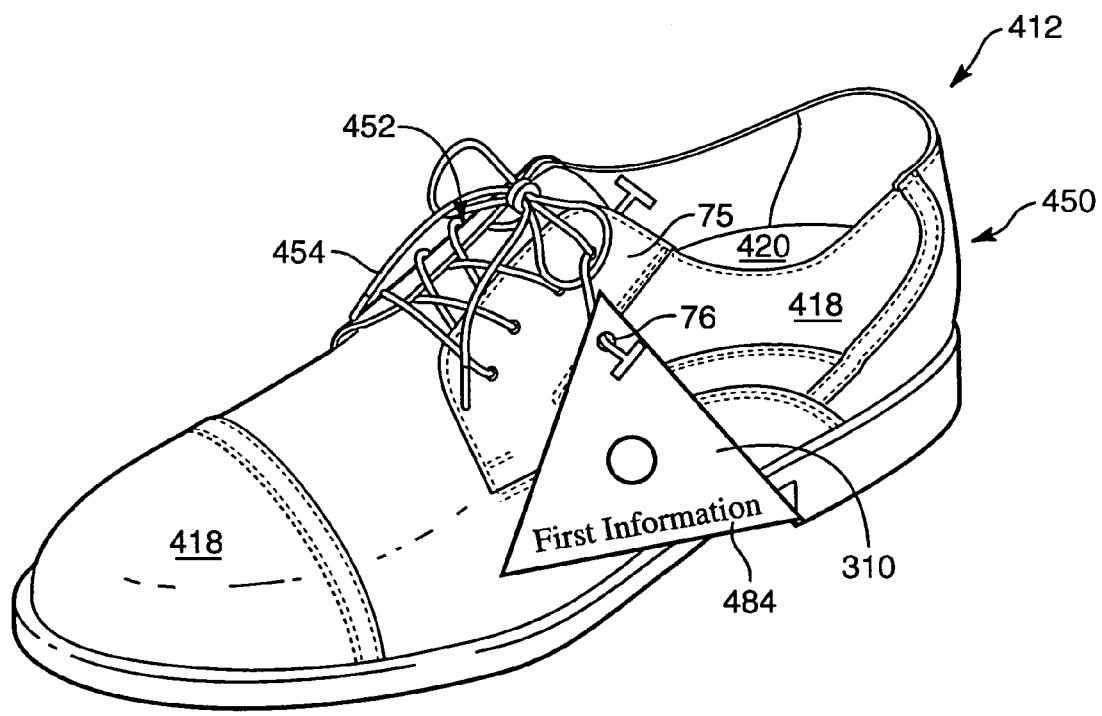
FIG. 13 is a perspective view of another example of a product with attached labels in accordance with the invention.

Referring now to FIG. 13, a type of footgear 450 is illustrated as one embodiment of a product 412. An eyelet 452, a lace 454, an exterior surface 418, an interior 420, and other features of a footgear 450 may be accessible. A tether 75 may attach the label 414 to the footgear 450 at these or other features without damaging the footgear 450. Because footgear 450 may be somewhat soft in some locations and is frequently shipped and sold in boxes and other hard packaging, footgear 450 is another ideal product 412 for use with a label 410. The packaging of the footgear 450 may tend to prevent the label 410 from being damaged prior to purchase of the product 412 by a consumer.

The label 410, usable as illustrated and described in conjunction with a garment 414, a toy 440, and a footgear 450, may rely on of the ability of these products to provide the needed padding and protection of the label 410 prior to purchase by a consumer. However, it will be appreciated by those of skill in the art that the label 410 may be configured to function in conjunction with other products 412 that may require additional measures to insure that the label 410 is delivered to a consumer without damage. These other products may include headgear, foodstuffs, furniture, materials, equipment, appliances, sporting goods, dry goods, tools, machinery, plants, and the like. With such products, labels 410 may be packaged, shipped, or both independently from the product, and attached at the site of retail display. Labels 410 may be shipped with sufficient padding or other suitable packaging structures to protect from heat, bending, breakage, warping, weather, impact, magnetic fields, or the like.

Figure 14:
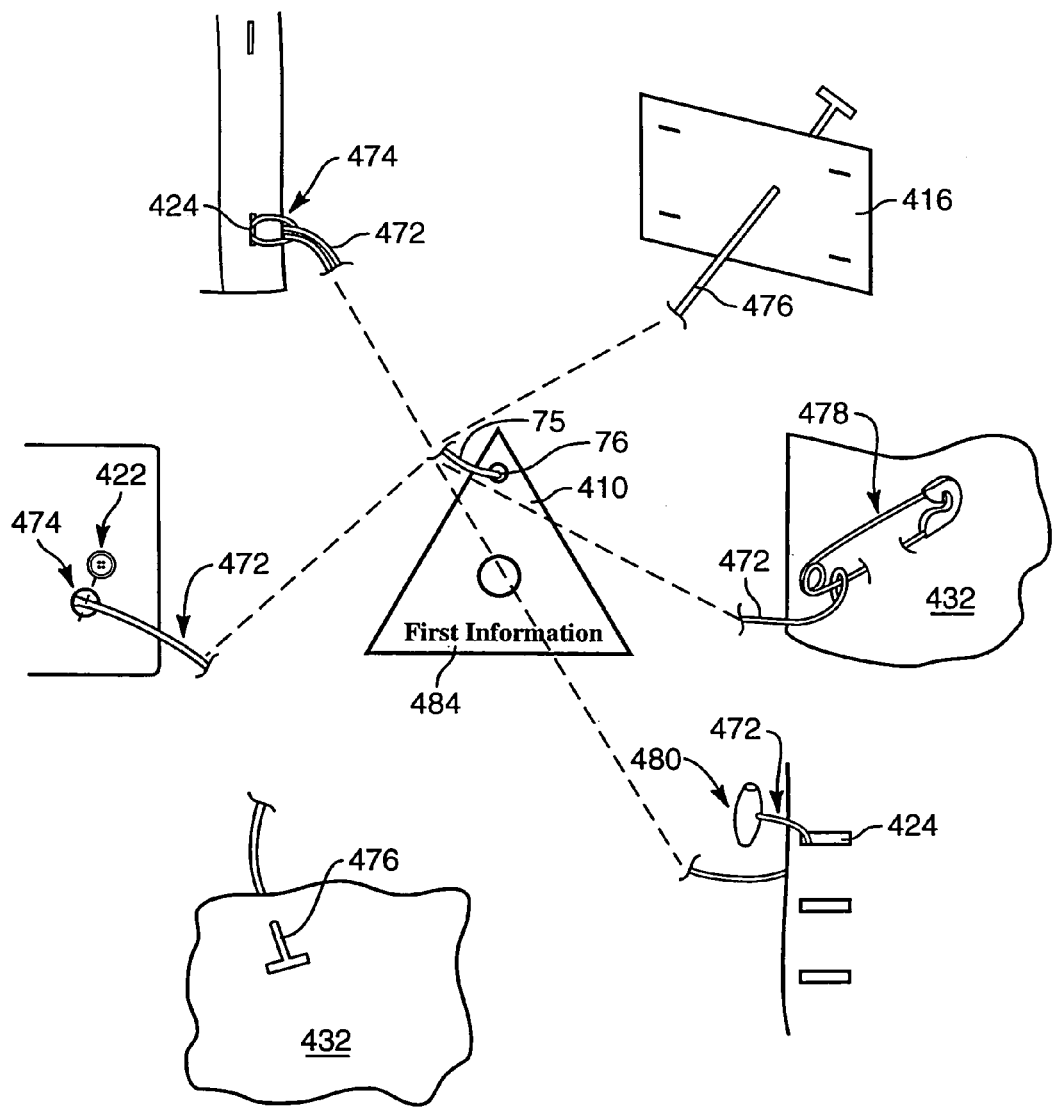
FIG. 14 is a schematic illustration of various types of tethers and locations of attachment suitable for implementing the invention.

Referring to FIG. 14, different types of tethers 75 may be employed. In one illustrated embodiment, a string tether 472 may be matched with a product 412 having a button hole 472. The label 410 may be attached to the string 472 through a penetration 76. The string may be looped or tied to create a double strand of string 472. The double stranded string 472 may passed through the button hole 472. The label 410 may pass back through the resulting loop forming a knot 474 securing the label 410 to the product 412. A knot 474 may attach a string tether 472 to a button 422 by a wrapping of double stranded string around the base of the button 422 and passing the attached label through the resulting loop.

In alternative embodiments, a pin 478 may be used to attach the string tether 472 to the product 412. The pin 478 may be attached to the product 412 by inserting the pin 478 through the outer surface 432 of the product 412. The string 472 may be tied to the pin using a square knot 482 or another knot 482.

Additionally, a stop 480 may be attached to the string 472 and passed through a button hole 424. The stop 480 may be made by attaching an end of a string to a crossbar, such as an elongated, thin piece of plastic, metal, wood, or the like. The length of the stop 480 tends to position itself accross the button hole 424. Thus, the stop 480 may easily enter the button hole 424 when inserted end-first but will only exit the button hole 424 when carefully oriented by a user in the same manner.

With most of the disclosed methods of attachment, the string 472 may actually be made of any suitable, functional material. For example suitable materials may include plastic, cotton, paper, nylon, hemp, or other natural or manmade stranded materials.

In another embodiment tether a 75 may be a T-tether 476 made of a thin, flexible piece of plastic with a rigid stop (crossbar or "T") at each end. The T-tether 476 may be attached to product 412 through the conventional, attached product or material label 416 or through a surface 432 of the product 412.

Referring to FIG. 5, a user-computer-readable label 410 may be substituted for a CD-ROM tag 60. A sleeve 110 or substrate 112 may mount or otherwise secure a label 410/60 to a product 412. The sleeve 110 or substrate 112 may be secured directly to a package, or tethered thereto by a tether 75 by any suitable method, such as those illustrated in FIGS. 3-5. In one embodiment, a backing 114 may connect to a cover 116 having a seam 117 for securing or bonding 117 the cover 116 to the backing 114. A label 410, 60 may be inserted between the cover 116 and backing 114 forming a sleeve 110 or envelope 110.

In other embodiments, a pedestal 120 or stub 120 may penetrate the aperture 61 to retain a label 410, 60. In certain embodiments, a foot 121 of a pedestal 120 may secure the pedestal 120 to a substrate 112 or backing 114. A keeper 122 may serve to retain the label 410, 60 on the pedestal 120. In selected embodiments, fingers 123 may provide both a pedestal and retention function. In other embodiments, a detent 124 may secure or engage a label 410, 60 with a pedestal 120.

In certain embodiments, a lock 126 may engage a catch 128 for securing a keeper 122 in or on a pedestal 120. The mechanism for latching the lock 126 catch 128 may be selected from a virtually infinite number mechanical engagements.

Figure 15:
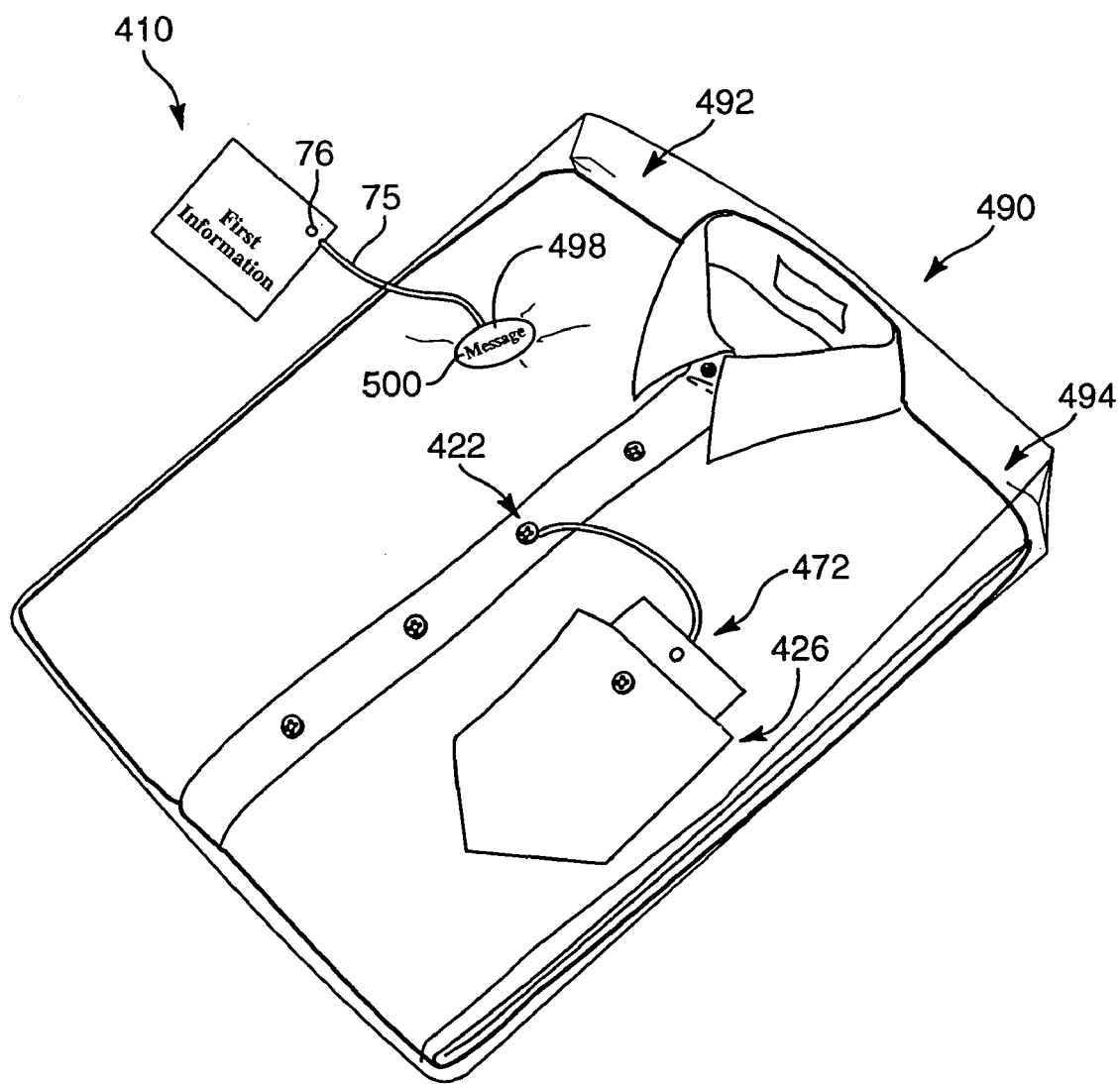
FIG. 15 is a perspective view of an example of a product having soft packaging having labels attached in accordance with the invention.
Figure 16:
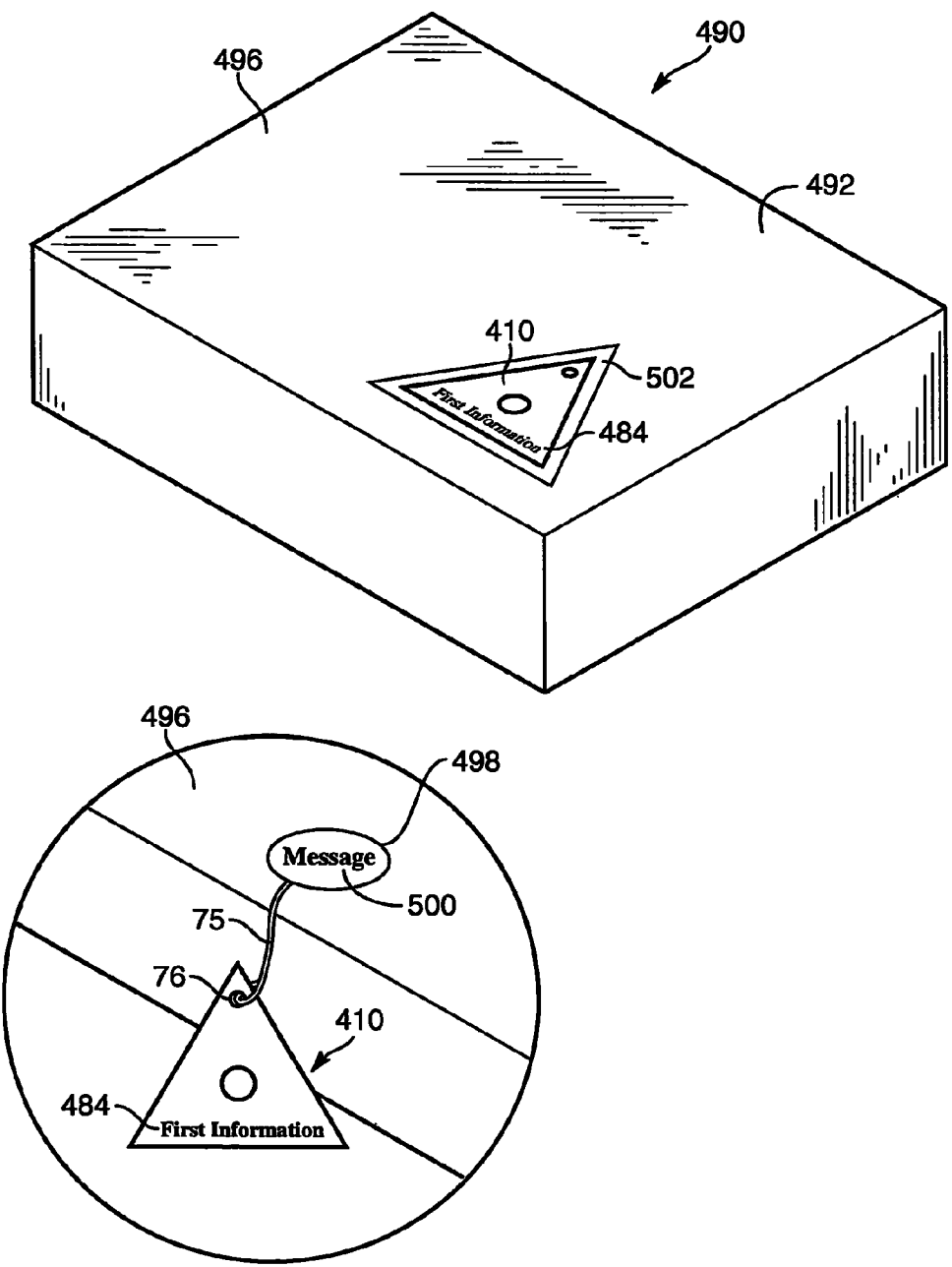
FIG. 16 is a perspective view of and example of a product having hard packaging having labels attached in accordance with the invention.

Referring now to FIGS. 15 and 16, a packaged product 490 may be a product 412 surrounded by packaging 492. In one embodiment, the packaging 492 may be soft packaging 494. Soft packaging 494 may comprise any suitable envelope, a bag, or other covering made of plastic, paper, cloth, or other flexible or flaccid material.

In another embodiment, the packaging 492 may be hard packaging 496. Hard packaging 496 may be a box, case, frame, or the like and may be made of paper, cardboard, wood, metal, or other comparatively stiff and strong structural material.

A label 410 may be attached to a packaged product 490 by securement to an unpackaged product 412 later inserted into the packaging 492. For example, in the embodiment illustrated in FIG. 15, the label 410 is attached by a string tether 472 to a button 422 and then inserted into a pocket 426.

The label 410 may also be attached directly to the packaging 492 by a tether 75 by any of the previously discussed methods and structures or another more suitable. In the embodiment of FIG. 15, the tether 75 is attached to the packaging 492 by a fastener. The fastener 498 may be a staple, a sticker, a pin, a T-tether, a rivet, glue, or the like. If the fastener 498 has a significant surface area, as, for example a sticker, the fastener may have printed on a face or otherwise convey fastener a message 500. The fastener message 500 may correspond to information 484.

A label 410 may also be attached by an adhesive 502 directly to a surface 493 of the packaging 492 or the product 412. The adhesive 502 may securely hold the label 410 to the packaging 492, yet be readily removable from the label 410.

Figure 17:
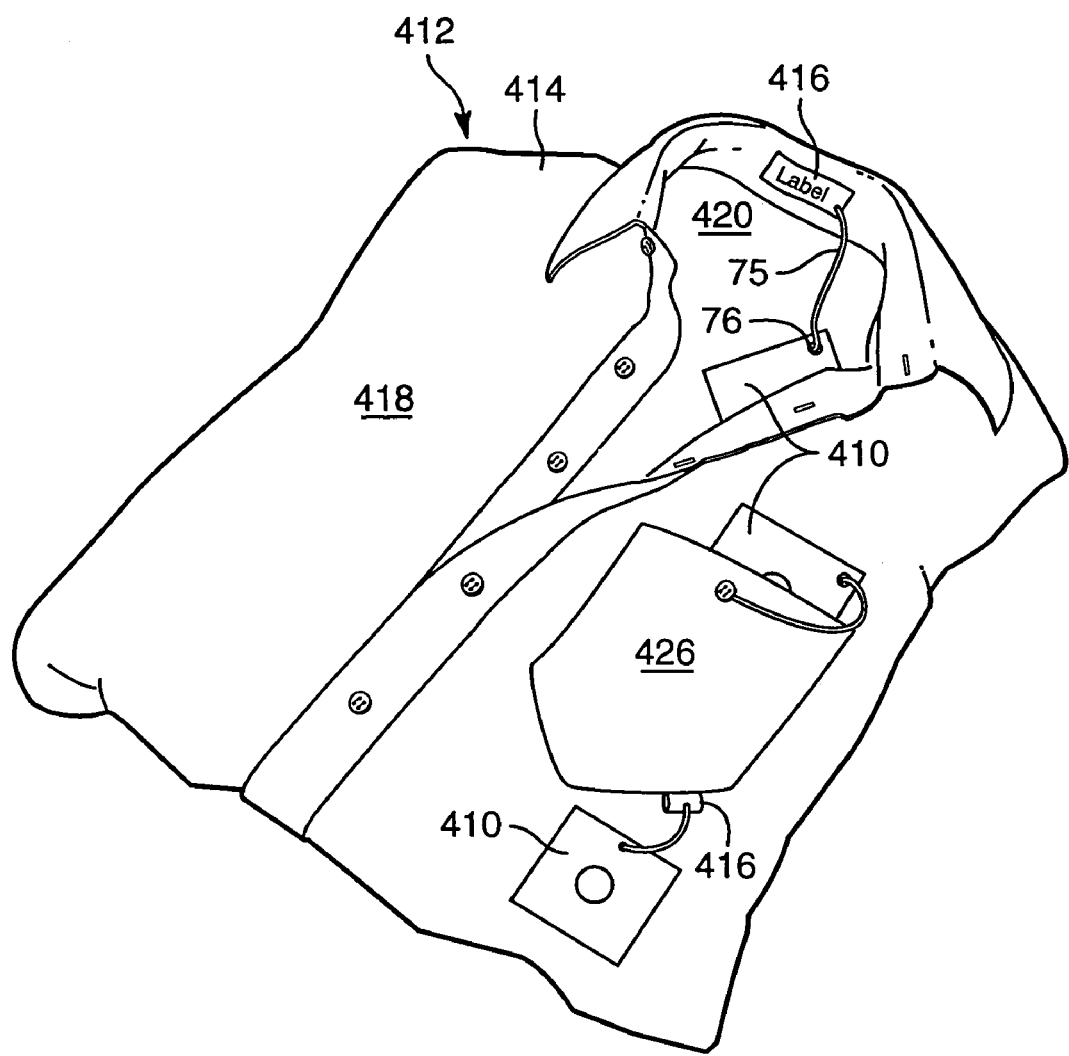
FIG. 17 is a perspective view and other example of a product having labels positioned partially inside the interior of a product.

Referring now to FIG. 17, a product 412 may have an exterior 418 and an interior 420. The label 410 may be attached to the product 412 to be positioned at least partially in the interior of the product. The label 410 may be secured by a tether 75 and penetration 76 in the attached product or materials label 416 to position the label 410 in the interior 420 of the garment 414. The label 410 may also be secured to a button 422 a tether 75. The label 410 may be placed in a pocket 426, one interior region 420 of the product 412.

Figure 18:
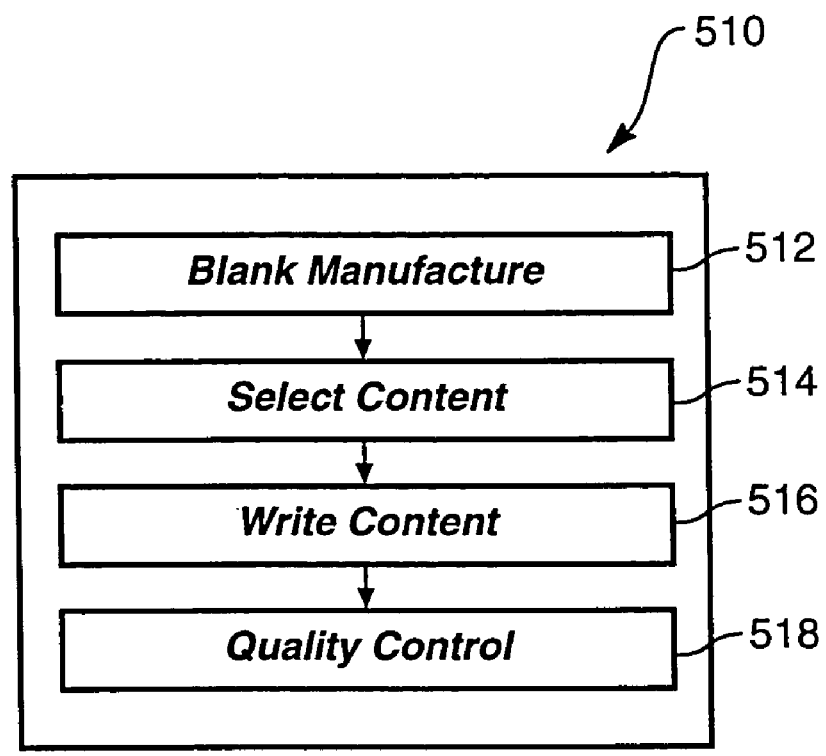
FIG. 18 is a schematic block diagram illustrating a manufacturing process for labels in accordance with the invention.

Referring to FIG. 18, one schematic block diagram illustrates a process of label manufacture 510. Initial manufacture 512 of blank computer-readable media may precede the selection 514 of the computer-readable content to be stored in computer-readable medium. Writing 516 the content to the computer-readable medium may be followed by quality control 518 process.

Figure 19:
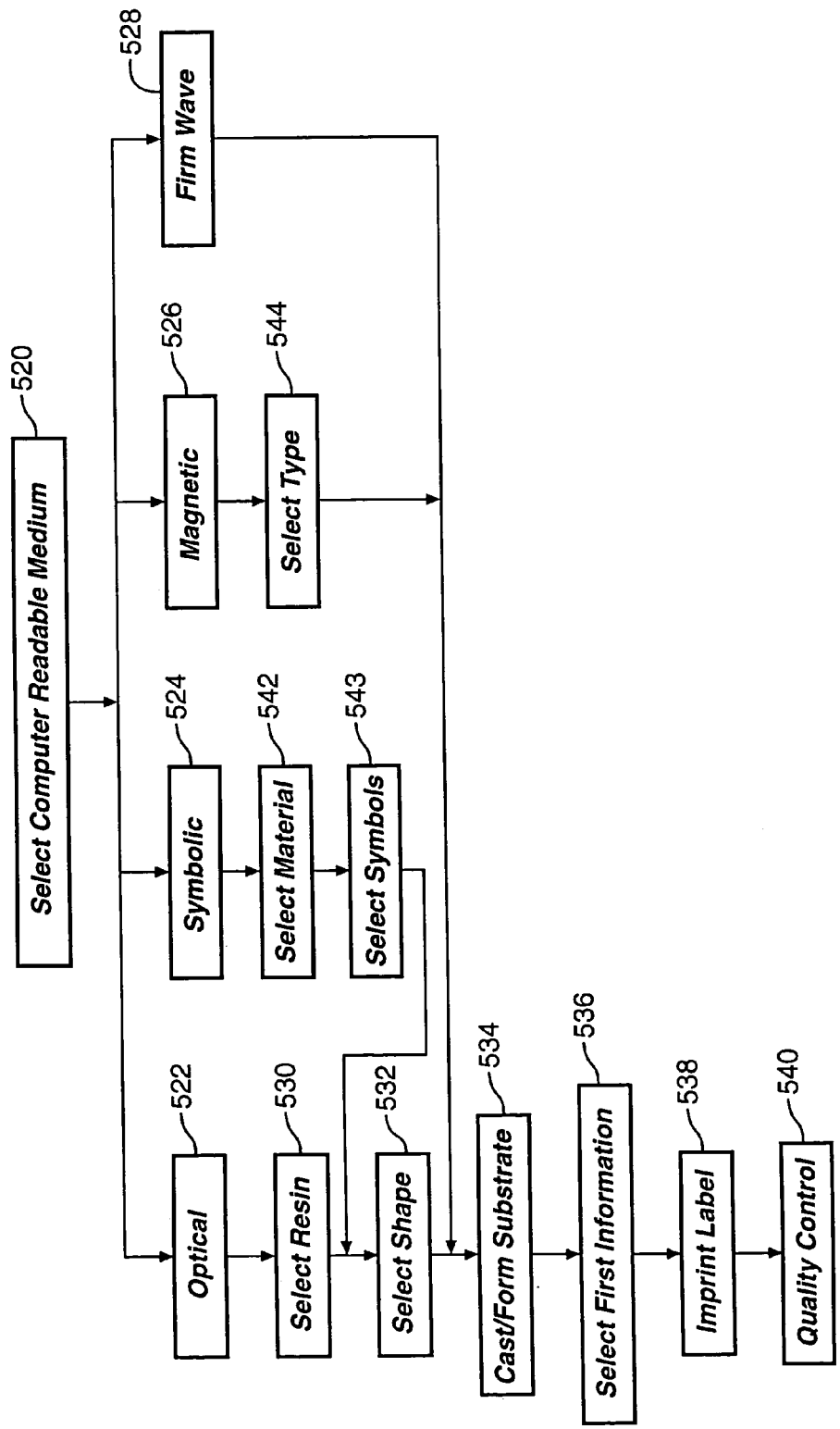
FIG. 19 is a schematic block diagram illustrating a manufacturing process for blank labels in accordance with the invention.

Referring now to FIG. 19, blank manufacture 512 may begin with selection 520 of the type of computer-readable medium to be relied upon. In the illustrated embodiment, a user may, for example, select from an optical medium 522, symbolic medium 524, magnetic medium 526, firmware medium 528, or the like.

The selection 520 of the type of medium may depend on a number of factors including for example medium availability, storage capacity, storage density, durability, cost of production, and availability of medium readers among target consumers. In one embodiment, optical media such as a CD-ROM 460 or DVD 468 maybe selected. The optical media are readily available, have a large storage capacity, are durable, are inexpensive, enjoy wide use among consumers. Other types of media such as symbolic media and firmware media do not enjoy wide distribution of readers among consumers but may grow in popularity as the installed base of reading devices grows.

If an optical medium is selected, manufacture 510 may require the selection of a resin 530, selection of a shape 532, formation 534 of substrates, information selection 536, imprinting of the label 538, and quality control 540. Resin selection 530 may be made from among the types of resin known in the art. Shape selection 532 may accommodate several variables. For example, for an optical medium, current technology dictates a symmetrical balanced shape to spin evenly. Addition of precisely placed ballast may be used in certain embodiments. The shape may be selected to convey the information 484. For example, if a manufacturer of a product 412 has a readily recognizable shape in its trademark, the shape may be selected as the shape of the optical medium.

Once a resin selection 530 and shape selection 532 is complete, the formation of the substrate 534 may occur. Selection 536 of the information 484 to be printed on the label 410 may involve consideration of the type of information to be conveyed by the label 410 and the manner in which it is to be conveyed. Information 484 may be conveyed through the shape of the medium. Likewise color of a medium or the color printed on the medium may convey information 484.

Pictures and graphics may be printed on or adhered to the medium in a manner to convey information 484. Words may be printed on or adhered to the label 410 in order to convey information 484. Once the selection 536 of the information 484 is complete, the information 538 may be imprinted 484 onto the label 410. Thereafter it may be useful to have a system available for sampling and verifying the quality of the produced blank labels 410.

If a type of medium other than an optical medium 522 is selected, additional steps may be relied upon. For example, if a symbolic code medium 524 is selected, the selection of the material 542 on which the code is to be imprinted may be necessary. Selected materials 542 may include paper, cardboard, fabric, plastic, and the like. The material selected 542 may depend on the type of reader available.

The symbolic code 543 itself may include dots, images, bar codes, or the like. The process of manufacture may be the analogous to those for the optical medium commencing with selection of shape 532.

If a magnetic medium 526 is selected, an additional step of type selection may be warranted. Currently, several configurations of magnetic media are available, including floppy disks, zip disks, magnetic strips, magnetic tape, and so forth. Size and storage considerations may favor any one of these types of magnetic media over another in certain applications. However, wherever technology provides a certain standard configuration for each of these type of magnetic media, the process may be analogous to that for the optical process 522 at the formation step 534.

Firmware 528 may also be selected as a computer-readable medium. The firmware may be a chip 466 imbedded in a substrate such as a plastic card. The chip may contain computer-readable information that can be accessed when the chip is positioned to be accessible by a computer. Technology may dictate many aspects of the chip including its shape. The manufacturing process may then be analogous to the optical medium process 522 at the formation step 534.

Figure 20:
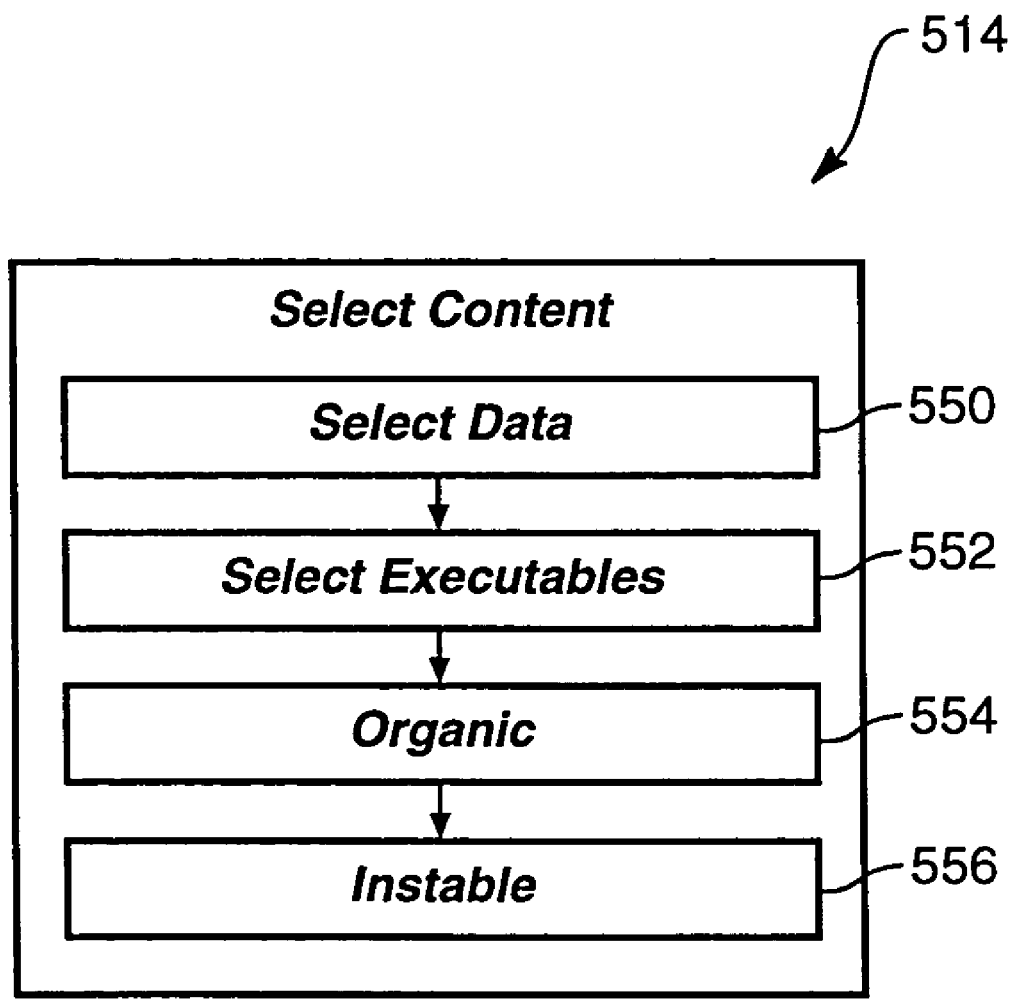
FIG. 20 is a schematic block diagram illustrating a process for selecting content for a computer-readable label.

Referring to FIGS. 18 & 20, content selection 514 may include the selection of the other information 486 corresponding to data files and executable files. The data selection 550 may depend on the data the vendor wants to covey to and collect from a user. Executables selection 552 may depend on whether the executables are organic 534 to a user's system installable files 556.

Referring to FIG. 18, writing 516 may be directly related to the type of medium selected. The labels may be examined 518 for quality control and then be available to be affixed to a product by a suitable means.

From the above discussion, it will be appreciated that the present invention provides a product labeling apparatus and method that provides entertainment or other useful products to a user, while providing links and implementation thereof back to a vendor of services or products. Advertising impressions and hot links may continue long after a product is used. Accordingly, user information may be provided for use by user, a vendor, or both. Meanwhile, product information may be provided from a vendor to a user. The data and software provided on a product label containing a computer-readable medium may thus facilitate the data needs of a vendor while providing a personal data repository for ready control and access by a user. Meanwhile, focused links may provide ready communication over the internet between a vendor and a purchaser for the benefit of each.

The present invention may be embodied in other specific forms without departing from its essential characteristics. The described embodiments are to be considered in all respects as illustrative only, and not restrictive. The scope of the invention is, therefore, indicated by the appended claims, rather than by the foregoing description. All changes within the meaning and range of equivalency of the claims are to be embraced within their scope.

What is claimed and desired to be secured by United States Letters Patent is:

1. An apparatus comprising:
   a second computer, associated with a vendor and containing a second processor generating vendor data;
   the second computer, configured to communicate through a network the vendor data, and operable to communicate with a first computer, defined by a first processor and associated with a user;
   a product provided by the vendor;
   a label comprising a face visible to a user at a point of purchase;
   the label, further comprising a computer readable medium integrated monolithically with the face;
   the label, wherein the computer readable medium further contains the vendor data, provided from the second computer by the vendor over the network, and computer readable instructions executable on the first computer for presenting vendor information to the user through the first computer, based on the vendor data;
   the label, further comprising information visible on the face and presenting advertising impressions corresponding to two of a manufacturer, a supplier, another name, content, a source of content, a slogan, a trademark, an image, a logo, a brand, a designation of source of the product, the vendor and the product, to the user at the point of purchase;
   a securement mechanism connecting the label to the product and configured to selectively secure to and release from the product label; and
   the label, wherein the computer readable medium is operably independent from and the vendor information is substantively distinct from the product.

2. The apparatus of claim 1, wherein the computer readable medium further contains executable instructions effective to direct the first processor to obtain additional data over the network.

3. An article comprising:
   a computer readable medium integrated monolithically with a label and storing operational and executable data structures, the data structures being configured to be readable by a first computer, associated with a purchaser of a product offered for sale;
   the computer readable medium being operably independent from the product;
   the computer readable medium, wherein the data structures further comprise vendor data, profiling data, and linking data, the vendor data, profiling data, and linking data being substantively distinct from the product;
   the computer readable medium, wherein the vendor data is associated with a source of the product and comprises instructions executable by the first computer to present to the purchaser a presentation provided from the vendor;
   the computer readable medium, wherein the profiling data comprises instructions executable by the first computer to obtain information from the purchaser;
   the computer readable medium, wherein the linking data comprises instructions executable to control communication of the first computer with a second computer associated with the vendor over a network operably connectable therebetween;
   the label, labeling and being removably connected to the product;
   the label, further comprising a face presenting an image, visible to and presenting an advertising impression to, the purchaser at a point of purchase; and
   the label, wherein the advertising impression corresponds to at least two of a supplier, another name, content, a source of content, a slogan, a trademark, an image, a logo, a brand, a designation of source of the product, a vendor of the product, a manufacturer thereof, and the product.

4. The article of claim 3, wherein:
   the data structures further comprise executables comprising instructions executable by the first computer.

5. The article of claim 4, wherein:
   the executables are effective to control communication of the first computer with a second computer associated with the vendor.

6. The article of claim 3, wherein the computer readable medium stores a presentation to the user independent from the product.

7. The article of claim 3, further comprising packaging covering at least a portion of the product, the label being selectively secured to the packaging.

8. The article of claim 7, wherein the label is contained within the packaging to be retained therein.

9. The article of claim 8, wherein the label is secured to the exterior of the packaging.

10. A method comprising:
    providing a processor;
    providing, to the processor, vendor data corresponding to a source of products and directed to purchasers of the products, the vendor data being substantively distinct from the products;

providing a label designating the source and comprising a face, visible to a purchaser at a point of purchase;

providing an image on the face, the image delivering advertising impressions to the purchaser at the point of purchase, corresponding to two of a supplier, another name, content, a source of content, a slogan, a trademark, an image, a logo, a brand, a designation of source of the product, a vendor of the product, a manufacturer thereof, and the product;

the providing the label, wherein the label further comprises a computer readable storage medium, readable by a computer of the purchaser, the computer readable storage medium being operably independent of the products and monolithically integrated within the label;

recording, by the processor, the vendor data on the computer readable storage medium to be readable by and operable on the computer of the purchaser to initiate communication thereof with the vendor;

securing the label to a product, of the products, to be removable by the purchaser; and distributing the label and product to the purchaser.

11. The method of claim 10, further comprising:
providing instructions for installing the label in a drive associated with the computer of the purchaser.

12. The method of claim 10, wherein the vendor data further comprises executables effective to program the computer of the purchaser.

13. The method of claim 10, wherein the vendor data comprises instructions effective to present to the purchaser additional advertising impressions from the computer of the purchaser.

14. The method of claim 10, further comprising:
providing packaging for the product, the packaging covering at least a portion of the product.

15. The method of claim 14, wherein the packaging connects the label to the product.

16. The method of claim 15, further comprising providing a pedestal positioning the label with respect to the packaging.

17. The method of claim 14, wherein the packaging completely encloses the product.

18. The method of claim 14, wherein the label is attached to at least one of the product and the packaging in a manner so as to be readily removable by the purchaser without damage to the product and without damage to the label.

19. The method of claim 14, further comprising fixing the label directly to at least one of the product and the packaging.

20. A method comprising:
providing a processor;
providing a label selectively securable to products to designate a source of the products and comprising a computer readable storage medium monolithically integrated therein, the computer readable storage medium being operably independent from the products;
providing, to the processor, vendor data corresponding to the source and directed to purchasers of the products, the vendor data being substantively distinct from the products;
recording, by the processor, the vendor data on the computer readable storage medium to be readable by a first computer associated with a retail purchaser, from among the purchasers of the products;
the providing vendor data, further comprising providing instructions executable by the first computer to link to the processor over a network to present to the retail purchaser access, from the source, to a presentation;
the providing the label, further comprising providing a face thereof presenting an image, visible to and presenting advertising impressions to, the retail purchaser at a point of purchase;
the providing the label, wherein the advertising impressions correspond to at least two of a supplier, another name, content, a source of content, a slogan, a trademark, an image, a logo, a brand, a designation of source of the product, a vendor of the product, a manufacturer thereof, and the product;
securing the label to a product of the products;
distributing the label and the product to the retail purchaser.

21. The method of claim 20, wherein the presentation comprises entertainment presenting additional advertising impressions corresponding to at least one of the product, the manufacturer, and the source.

22. The method of claim 20, wherein the presentation is an audio-visual presentation by the first computer.

23. The method of claim 20, wherein the presentation is entertainment selected from a game, a movie, an advertisement, and a test.

24. An article of manufacture, comprising:
a product displayed for sale to a retail purchaser at a retail site;
a securement, connecting a label to the product;
the label, further comprising advertising, visible at a point of purchase, to provide an advertising impression to the retail purchaser for the product, the advertising impression corresponding to at least two of a supplier, another name, content, a source of content, a slogan, a trademark, an image, a logo, a brand, a designation of source of the product, a vendor of the product, a manufacturer thereof, and the product;
the label, further comprising a computer readable storage medium monolithically integrated therein and operably independent from the product; and
the label, wherein the computer readable storage medium further comprises instructions executable by a computing device of the retail purchaser to contact, over a network, a computer corresponding to a source of the advertising impression, the instructions being substantively distinct from the product.

25. The article of claim 24,
wherein the computer readable storage medium comprises a physical object having a face presenting the advertising impression;
wherein the computer readable storage medium is at least one of optically, magnetically, and electronically readable.

26. The article of claim 24, further comprising packaging covering at least a portion of the product, the securement being connected directly to the packaging.

27. The article of claim 26, wherein the packaging completely encloses the product.

28. The article of claim 26, wherein the packaging comprises plastic selected from soft plastic and hard plastic.

29. The article of claim 27, wherein the packaging further comprises a detent fixing the label to the packaging.

30. The article of claim 27, wherein the label is completely inside the packaging.

31. An apparatus comprising:
a product provided by a source;
a label affixed to the product by the source;
the label comprising first information providing an advertising impression, visible by and identifying to a purchaser of the product, at a point of purchase, at least two of a supplier, another name, content, a source of content, a slogan, a trademark, an image, a logo, a brand, a vendor, a manufacturer, the product and the source of the product;

the label further comprising a computer readable storage medium monolithically integrated therewith, operably independent from the product; and the label, wherein the computer readable storage medium stores instructions executable by a computer of the purchaser of the product including instructions effective to connect the computer of a purchaser over a network with a computer corresponding to the source, the instructions being substantively distinct from the product.

32. The apparatus of claim 31, wherein the apparatus further comprises at least one of:

a protector, covering the computer readable storage medium before use; and the label printed directly on the computer readable storage medium.

33. The apparatus of claim 31, wherein the computer readable storage medium is readable by at least one of an electromagnetic, optical, and electronic reader.

34. The apparatus of claim 31, wherein the computer-readable computer readable storage medium is formatted in at least one of a compact disk, floppy disk, digital video disk, magnetic strip, bar code, symbolic code, and an embedded chip.

35. The apparatus of claim 31, further comprising:

the first information printed on the label communicating to the user an identification of at least one of the product and the source by at least one of a color, shape, symbol, word, name, and phrase;

the computer readable storage medium further containing second information comprising information about at least one of the product, the source, other products, use of the product, services corresponding to the product, a game, entertainment, music, a data gathering interface, a test, a browser, a launcher, and an internet link; and the computer readable storage medium, readable by at least one of an electromagnetic, optical, and electronic reader.

36. A method comprising:

providing a processor;

writing, by the processor, on a computer readable storage medium, instructions executable by a computing device of an end user;

providing a product from a supplier to a vendor selling to the end user, the product being substantively distinct from the instructions;

providing a label connected to the product and having a face displaying an advertising impression directed to the end user;

the providing a label, wherein the advertising impression identifies at least two of a manufacturer, another name, content, source of content, slogan, trademark, image, logo, brand, designation of source, product, vendor, and supplier;

the providing the label, wherein the label further comprises the computer readable storage medium monolithically integrated therewith, the computer readable storage medium being operably independent from the product;

providing a communication over a network between the processor and the computing device of the end user, reflecting retailing of the product from the vendor to the end user; and the providing the communication occurring in consequence of loading and running by the computing device of the end user the instructions written on the computer readable storage medium.

37. The method of claim 36, wherein the product is selected from a magazine, a garment, headgear, footwear, a toy, a foodstuff, furniture, an appliance, sporting goods, dry goods, a tool, and a plant.

38. The method of claim 36, wherein:

the product is secured to at least one of a protector covering the computer readable storage medium before use, and the label monolithically printed on the computer readable storage medium;

the computer readable storage medium is readable by at least one of an electromagnetic, optical, and electronic reader; and the computer-readable storage medium is formatted in at least one of a compact disk, floppy disk, digital video disk, magnetic strip, bar code, symbolic code, and an embedded chip.

* * * * *